United States Patent
Yokoyama

(10) Patent No.: US 9,198,012 B2
(45) Date of Patent: Nov. 24, 2015

(54) COMMUNICATION APPARATUS AND COMMUNICATION METHOD FOR EXTRACTING NOTIFICATION INFORMATION FROM RECEIVED SIGNAL AND TRANSMITTING NOTIFICATION INFORMATION

(75) Inventor: Hitoshi Yokoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/456,771

(22) Filed: Apr. 26, 2012

(65) Prior Publication Data

US 2013/0023227 A1    Jan. 24, 2013

(30) Foreign Application Priority Data

Jul. 22, 2011    (JP) ................. 2011-161377

(51) Int. Cl.
*H04M 11/04*    (2006.01)
*H04W 4/22*    (2009.01)
*H04W 84/22*    (2009.01)

(52) U.S. Cl.
CPC ............ *H04W 4/22* (2013.01); *H04W 84/22* (2013.01)

(58) Field of Classification Search
CPC ..... H04W 4/22; H04W 76/007; H04W 52/46; H04W 84/12
USPC ........... 455/404.1, 404.2, 414.1–414.4, 11.1, 455/15, 16; 370/466, 467, 315
See application file for complete search history.

(56) References Cited

U.S. PATENT DOCUMENTS

| | | | |
|---|---|---|---|
| 5,778,189 A * | 7/1998 | Kimura et al. | 709/236 |
| 7,864,800 B2 * | 1/2011 | Takada et al. | 370/466 |
| 8,315,611 B2 * | 11/2012 | Colon | 455/414.4 |
| 8,855,138 B2 * | 10/2014 | Horn et al. | 370/466 |
| 2005/0151642 A1 * | 7/2005 | Tupler et al. | 340/539.18 |
| 2008/0311923 A1 | 12/2008 | Petrovic et al. | |

(Continued)

FOREIGN PATENT DOCUMENTS

| JP | 2005-269109 | 9/2005 |
|---|---|---|
| JP | 2005-538653 | 12/2005 |

(Continued)

OTHER PUBLICATIONS

3GPP TS 36.331 V9.5.0 (Dec. 2010) Technical Specification Group Radio Access Network, pp. 1-252.

(Continued)

*Primary Examiner* — Allahyar Kasraian
(74) *Attorney, Agent, or Firm* — Fujitsu Patent Center

(57) ABSTRACT

A communication apparatus includes a receiving unit, an extracting unit, a generating unit and a transmitting unit. The receiving unit receives a signal from a first network using a first communication method. The extracting unit extracts, from a signal received via a control channel of the first network, notification information that is broadcast to be notified to a communication apparatus belonging to the first network and also used by a communication apparatus belonging to a second network. Here, the second network uses a second communication method different from the first communication method. The generating unit generates a notification frame used to notify the communication apparatus belonging to the second network of the notification information. The transmitting unit transmits the notification frame to the communication apparatus belonging to the second network.

7 Claims, 30 Drawing Sheets

(56) References Cited

U.S. PATENT DOCUMENTS

| | | | |
|---|---|---|---|
| 2009/0181638 A1* | 7/2009 | Gottlieb | 455/404.1 |
| 2009/0221293 A1 | 9/2009 | Petrovic et al. | |
| 2010/0159870 A1* | 6/2010 | Jokinen | 455/404.1 |
| 2010/0202337 A1 | 8/2010 | Wienand | |
| 2011/0063105 A1* | 3/2011 | Bennett et al. | 340/539.11 |
| 2011/0111725 A1* | 5/2011 | Zonoun | 455/404.1 |
| 2012/0014335 A1 | 1/2012 | Adachi et al. | |

FOREIGN PATENT DOCUMENTS

| | | |
|---|---|---|
| JP | 2007-266777 | 10/2007 |
| JP | 2009-514279 | 4/2009 |
| JP | 2009-519636 | 5/2009 |
| JP | 2010-28153 | 2/2010 |
| JP | 2010-166401 | 7/2010 |
| JP | 2010-530658 | 9/2010 |
| WO | 2004/025928 A2 | 3/2004 |
| WO | WO-2007/048470 A1 | 5/2007 |
| WO | WO 2008/144835 A1 | 12/2008 |

OTHER PUBLICATIONS

JPOA—Japanese Office Action mailed on Dec. 24, 2104 for corresponding Japanese application No. 2011-161377, with partial English translation.

* cited by examiner

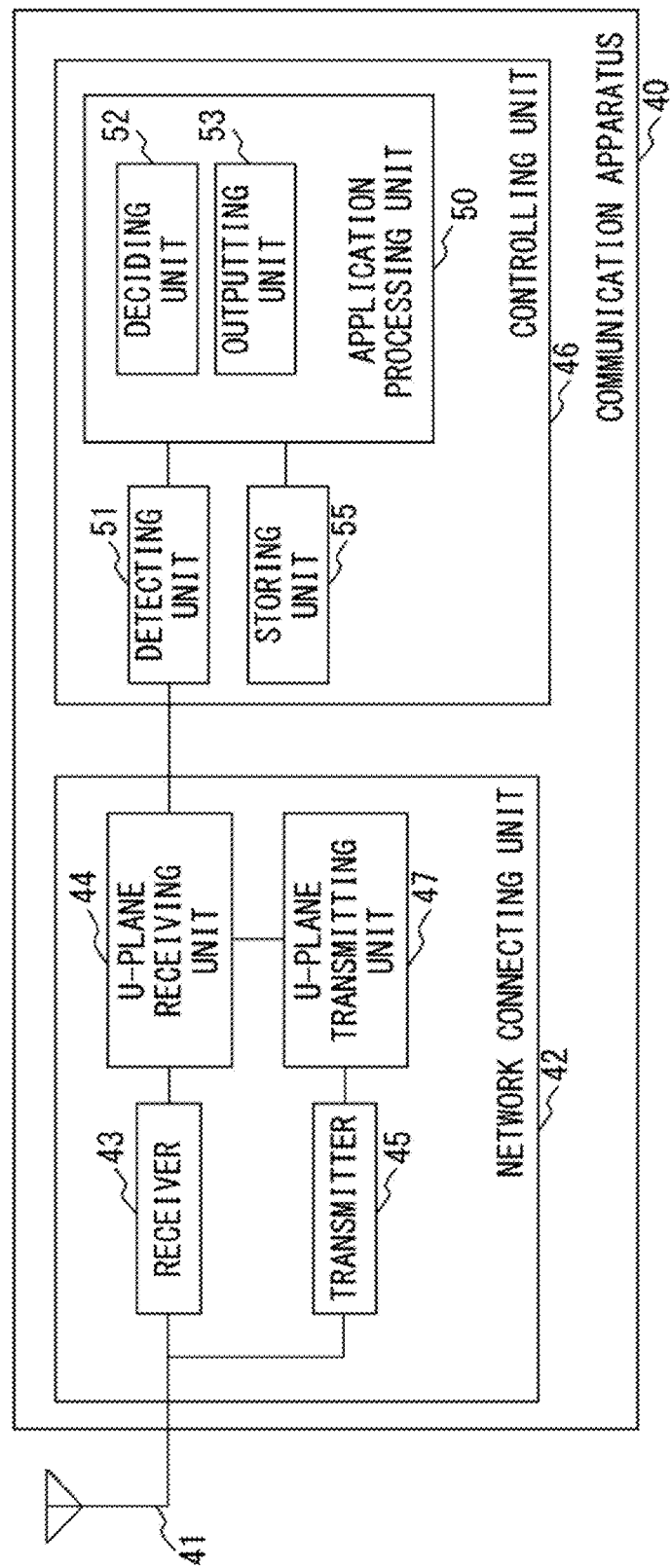
F I G. 6

```
-- ASN1START

SystemInformationBlockType10 ::=    SEQUENCE {
    messageIdentifier              BIT STRING (SIZE (16)),
    serialNumber                   BIT STRING (SIZE (16)),
    warningType                    OCTET STRING (SIZE (2)),
    warningSecurityInfo            OCTET STRING (SIZE (50))     OPTIONAL,   -- Need OP
    ...,
    lateNonCriticalExtension       OCTET STRING                 OPTIONAL    -- Need OP
}

-- ASN1STOP
```

F I G. 8

| Octet 1 | | | | | | | | Octet 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| Warning Type Value | | | | | | | ALARM SOUND FLAG | POP-UP FLAG | Padding | | | | | | |

FIG. 9

| Warning typeValue | TYPE |
|---|---|
| 0000000 | EARTHQUAKE |
| 0000001 | TSUNAMI |
| 0000010 | EARTHQUAKE AND TSUNAMI |
| 0000011 | TEST |
| 0000100 | OTHERS |
| 0000101~1111111 | RESERVED |

FIG. 10A

| EMERGENCY INFORMATION IDENTIFIER | TYPE |
|---|---|
| 0000000 | EARTHQUAKE |
| 0000001 | TSUNAMI |
| 0000010 | EARTHQUAKE AND TSUNAMI |
| 0000011 | TEST |
| 0000100 | OTHERS |

FIG. 10B

```
-- ASN1START

SystemInformationBlockType11 ::=    SEQUENCE {
    messageIdentifier              BIT STRING (SIZE (16)),
    serialNumber                   BIT STRING (SIZE (16)),
    warningMessageSegmentType      ENUMERATED {notLastSegment, lastSegment},
    warningMessageSegmentNumber    INTEGER (0..63),
    warningMessageSegment          OCTET STRING,
    dataCodingScheme               OCTET STRING (SIZE (1))    OPTIONAL,    -- Cond Segment1
    ...,
    lateNonCriticalExtension       OCTET STRING               OPTIONAL     -- Need OP
}

-- ASN1STOP
```

F I G. 11

| FLAG | ALARM FLAG | | POP-UP FLAG | |
|---|---|---|---|---|
| VALUE | 0 | 1 | 0 | 1 |
| OPERATION | NO ALARM SOUND OUTPUT | ALARM SOUND OUTPUT | NO DISPLAY | INFORMATION DISPLAY ON SCREEN |

F I G. 14

| dataCodingScheme | LANGUAGE |
|---|---|
| 00000000 | GERMAN |
| 00000001 | ENGLISH |
| 00000010 | ITALIAN |
| 00000011 | FRENCH |
| 00000100 | SPANISH |
| 00000101 | DUTCH |
| ... | ... |

FIG. 15

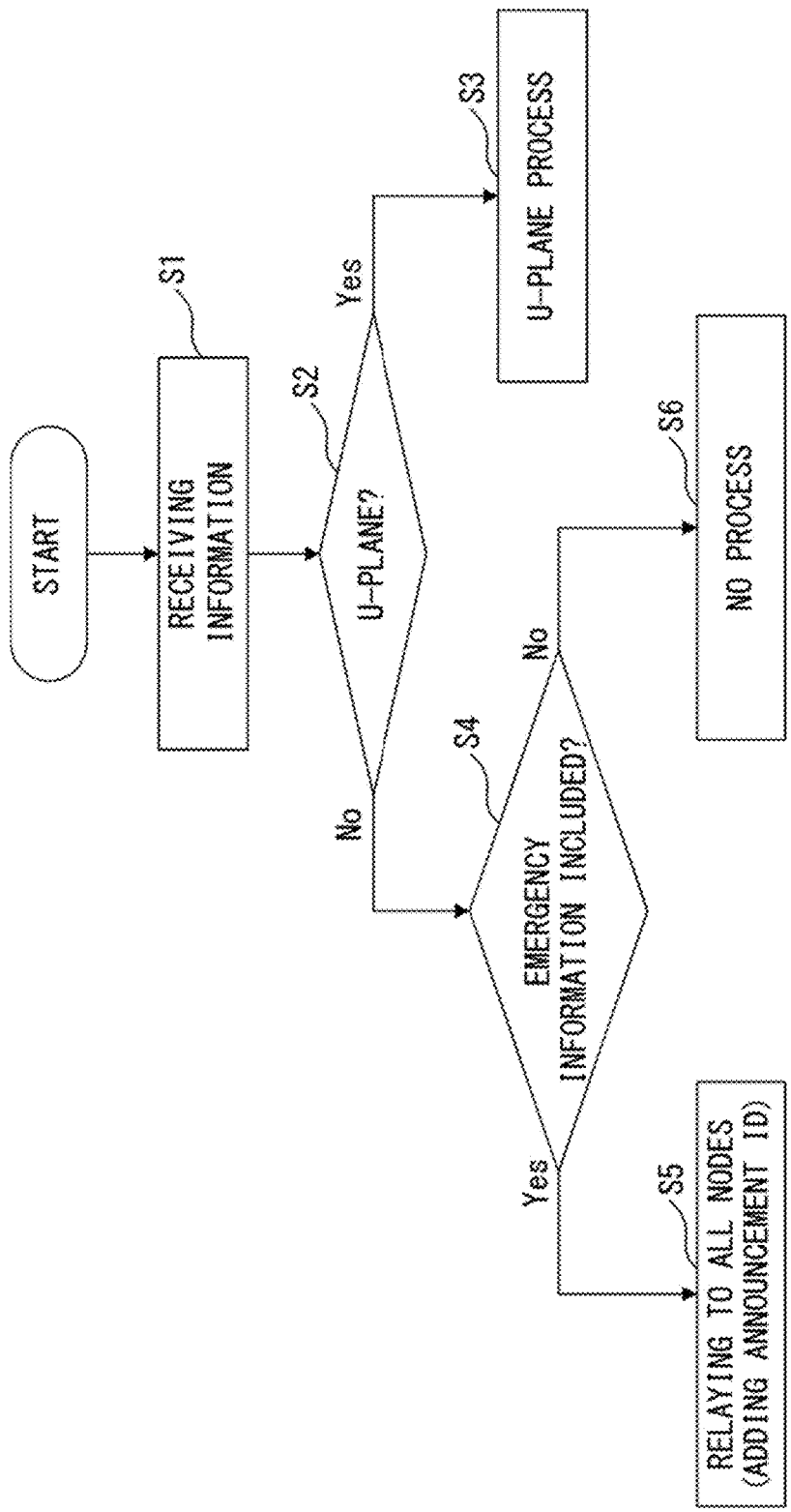
F I G. 16

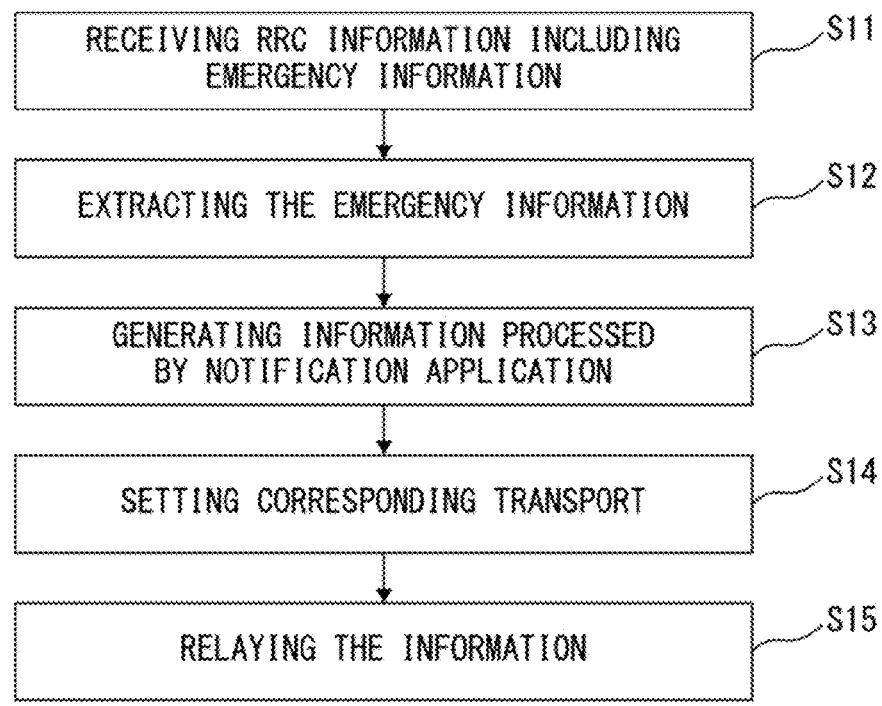
F I G. 17

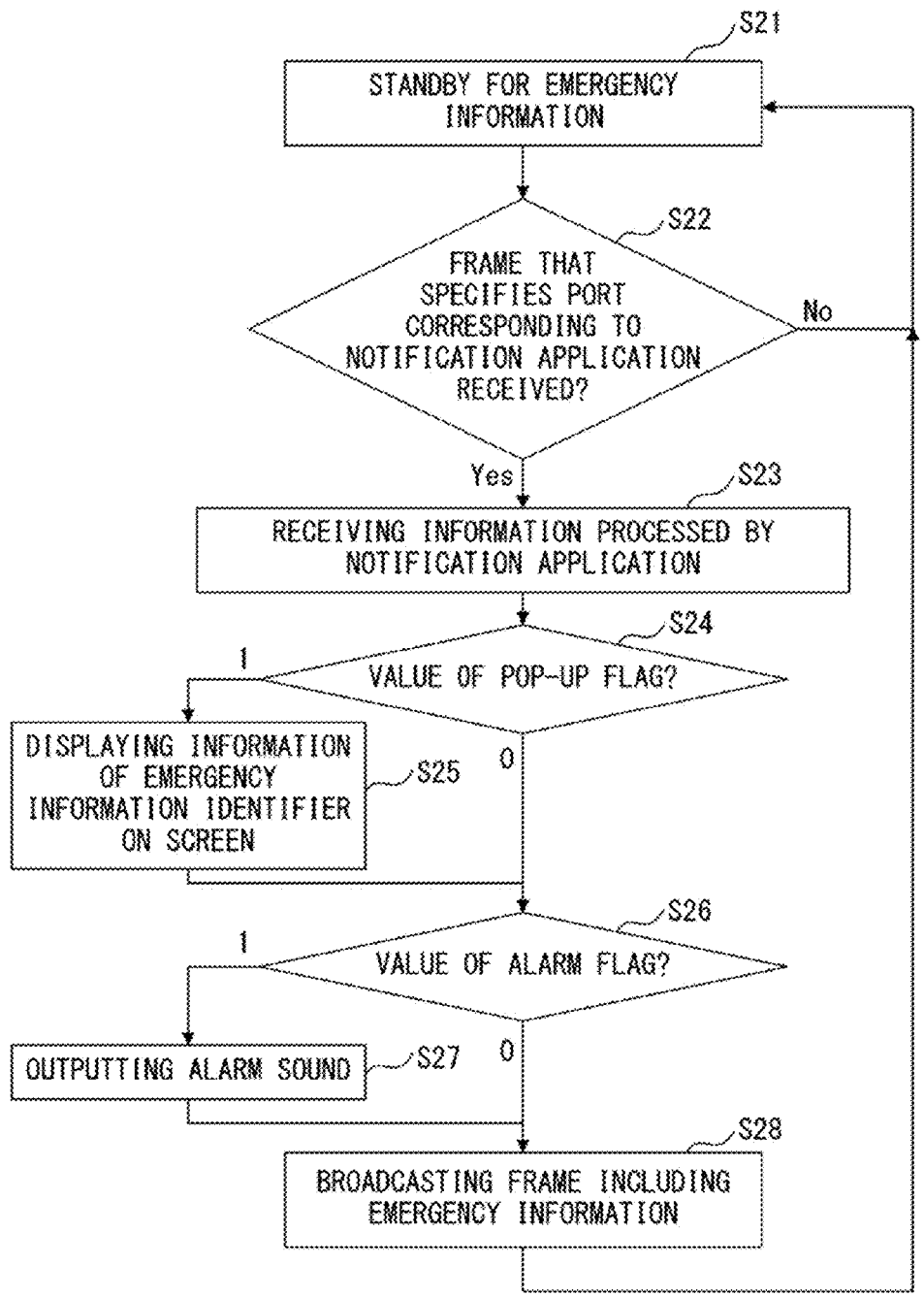
F I G. 1 8

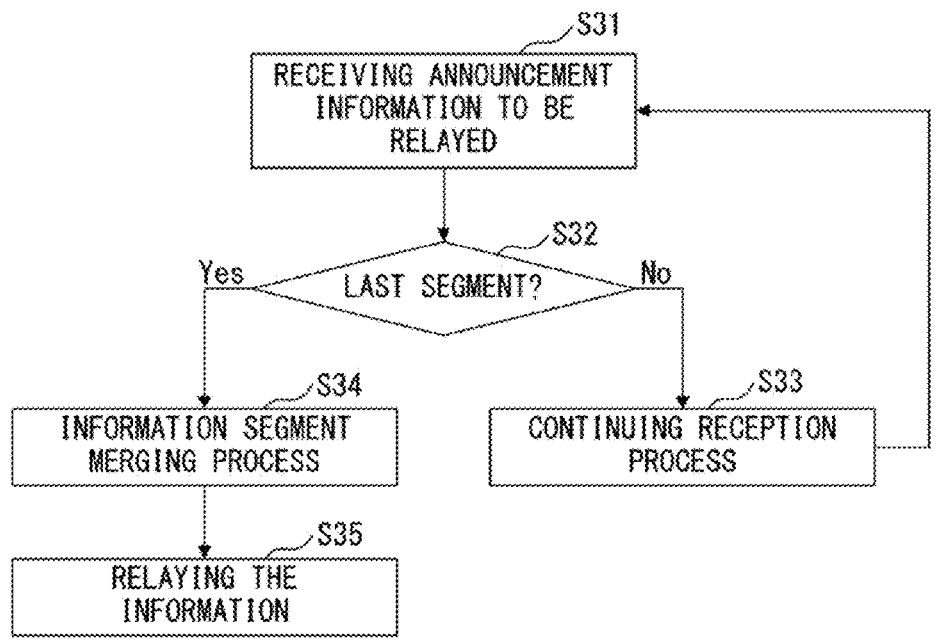
F I G. 20

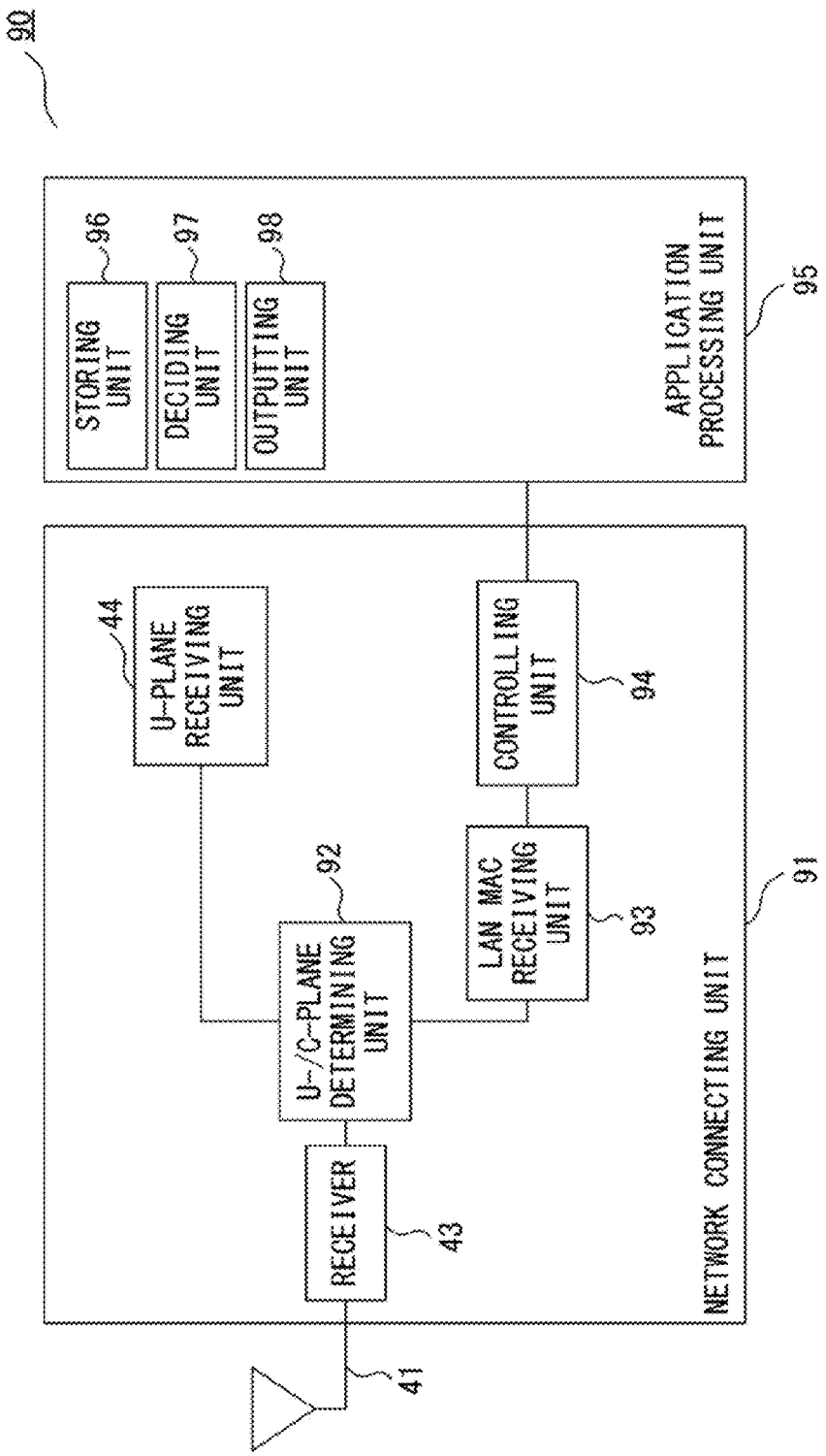
F I G. 2 2

FIG. 24A

| 2 | 2 | 6 | 6 | 6 | 2 | 0-2312 | 4 |
|---|---|---|---|---|---|---|---|
| FRAME CONTROL | DURATION /ID | DESTINA-TION ADDRESS | SOURCE ADDRESS | BSSID | SEQUENCE CONTROL | MAC MESSAGE | FCS |

<--------------------------------- MAC HEADER --------------------------------->

FIG. 24B

| 2(11) | 2 | 4 | 1 | 1 | 1 | 1 | 1 | 1 | 1 | 1 |
|---|---|---|---|---|---|---|---|---|---|---|
| PROTOCOL VERSION | TYPE | SUB-TYPE | To DS | From DS | More Flag | Retry | POWER MANAGE-MENT | More Data | WEP | Order |

FIG. 24C

| 2 | 2 | 6 | 6 | 6 | 2 | 0-2312 | 4 |
|---|---|---|---|---|---|---|---|
| FRAME CONTROL | DURATION /ID | DESTINA-TION ADDRESS | SOURCE ADDRESS | BSSID | SEQUENCE CONTROL | FRAME BODY | FCS |

<--------------------------------- MAC HEADER --------------------------------->

FIG. 24D

| 2(00) | 2 | 4 | 1 | 1 | 1 | 1 | 1 | 1 | 1 | 1 |
|---|---|---|---|---|---|---|---|---|---|---|
| PROTOCOL VERSION | TYPE | SUB-TYPE | To DS | From DS | More Flag | Retry | POWER MANAGE-MENT | More Data | WEP | Order |

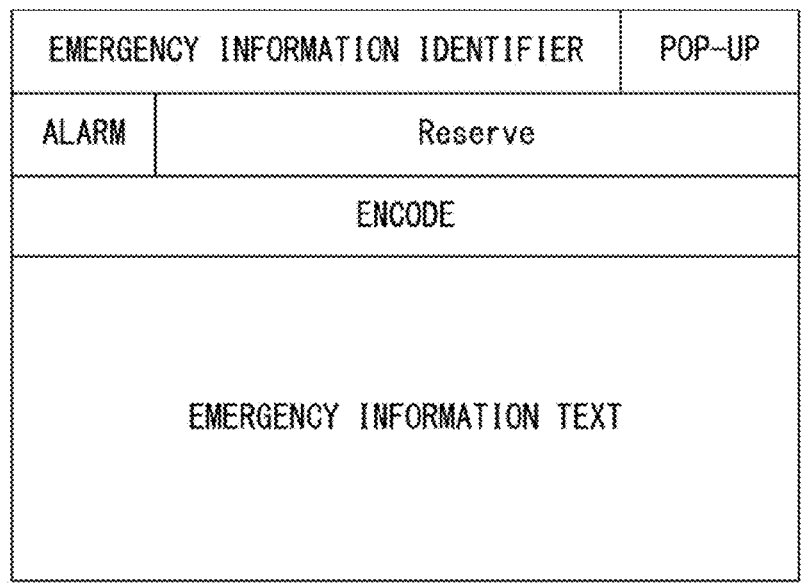
F I G. 2 5

COMMUNICATION APPARATUS AND COMMUNICATION METHOD FOR EXTRACTING NOTIFICATION INFORMATION FROM RECEIVED SIGNAL AND TRANSMITTING NOTIFICATION INFORMATION

CROSS-REFERENCE TO RELATED APPLICATION

This application is based upon and claims the benefit of priority of the prior Japanese Patent Application No. 2011-161377, filed on Jul. 22, 2011, the entire contents of which are incorporated herein by reference.

FIELD

The present invention relates to a communication apparatus and a communication method.

BACKGROUND

A cellular communication using a cell formed by a base station is used as one of wireless communication methods. Moreover, an ad hoc network is sometimes formed with an ad hoc communication made by a plurality of communication apparatuses not via a base station. However, since a cellular communication and an ad hoc communication use different protocols, user data (U-plane information) transmitted/received by a cellular network cannot be directly transmitted to an ad hoc network. Accordingly, as illustrated in FIG. 1, a relay apparatus 2 for including user data within a packet transmitted/received in a cellular communication in a frame that can be transmitted/received in an ad hoc communication and for relaying the frame to an ad hoc network is used.

FIG. 2 illustrates an example of a protocol used when user data is relayed from a system using a cellular communication to an ad hoc network. A central apparatus 1 transmits the user data to a base station 5 that forms a communication area of a communication apparatus that is an end user. A wired communication using a protocol such as Ether PHY (Ethernet Physical layer), Ether MAC (Ether Media Access Control), IP (Internet Protocol) or the like is made between the central apparatus 1 and the base station 5. The base station 5 generates a packet including the user data received from the central apparatus 1, and transmits the packet to a communication apparatus and a relay apparatus within a cell by using 3G (3rd Generation) PHY and 3G MAC. Here, the base station 5 generates 3G MAC information by using IP information received from the central apparatus 1. The relay apparatus 2 generates an ad hoc frame including the data of the packet received from the base station 5, and transmits the frame to a communication apparatus within the ad hoc network by using LAN PHY (Local Area Network PHY) and LAN MAC. In this way, user data transmitted/received by a system that makes a cellular communication can be received or transmitted by a communication apparatus within an ad hoc network.

For a transmission of user data, a method for distributing contents received via a broadcast wave with a wireless LAN communication is proposed. Also a system for receiving information of government authorities and for transmitting data on the received information to communication apparatuses that join a system is proposed as a broadcast system used at the time of a disaster or the like. Additionally, a method for mapping a different partition included in broadcast system information onto a shared transport channel or a broadcast transport channel is known. Furthermore, a method for shortening a delay caused when a wireless bearer is established by notifying a mobile terminal of settings of an available wireless bearer is proposed for a wireless communication.

PRIOR ART DOCUMENTS

Patent Documents

[Patent Document 1] Japanese Laid-open Patent Publication No. 2010-28153
[Patent Document 2] Japanese National Publication of International Patent Application No. 2010-530658
[Patent Document 3] Japanese National Publication of International Patent Application No. 2009-514279
[Patent Document 4] Japanese National Publication of International Patent Application No. 2009-519636

As described above in BACKGROUND, user data transmitted/received by using a layer equal to or higher than an IP layer is relayed by a relay apparatus 2 from a cellular network to an ad hoc network. However, the relay apparatus 2 does not relay (C-plane) control information transmitted/received by the cellular network to the ad hoc network. Here, emergency information such as an emergency earthquake alert or the like is broadcast as control information within the cellular network. Accordingly, there is a problem that the relay apparatus 2 cannot relay emergency information broadcast within the cellular network to the ad hoc network. The above description is provided by taking the cellular network and the ad hoc network as an example. A similar problem occurs between two networks using different communication methods because control information used in one of the networks is not relayed to the other.

SUMMARY

A communication apparatus according to an embodiment includes a receiving unit, an extracting unit, a generating unit and a transmitting unit. The receiving unit receives a signal from a first network using a first communication method. The extracting unit extracts, from a signal received via a control channel of the first network, notification information that is broadcast to be notified to a communication apparatus belonging to the first network and also used by a communication apparatus belonging to a second network. Here, the second network uses a second communication method different from the first communication method. The generating unit generates a notification frame used to notify the communication apparatus belonging to the second network of the notification information. The transmitting unit transmits the notification frame to the communication apparatus belonging to the second network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a configuration of a communication apparatus.

FIG. 8 illustrates an example of information elements included in an SIB 10.

FIG. 9 illustrates an example of a format of a warningType field.

FIGS. 10A and 10B illustrate examples of a disaster identification table.

FIG. 11 illustrates an example of information elements included in an SIB 11.

FIG. 14 illustrates an example of an operation setting table.

FIG. 15 illustrates an example of an Encode table.

FIG. 16 is a flowchart for explaining an example of a method for determining whether or not received information is information to be relayed.

FIG. 17 is a flowchart for explaining an example of operations of a relay apparatus that has received information to be relayed.

FIG. 18 is a flowchart illustrating an example of operations of a communication apparatus that has received emergency information.

FIG. 20 is a flowchart for explaining operations of an extracting unit in a second embodiment.

FIG. 22 illustrates an example of a configuration of a communication apparatus.

FIGS. 24A to 24D illustrate an example of a configuration of a frame.

FIG. 25 illustrates an example of a format of a MAC message generated by a generating unit.

DESCRIPTION OF EMBODIMENTS

Figure 1:
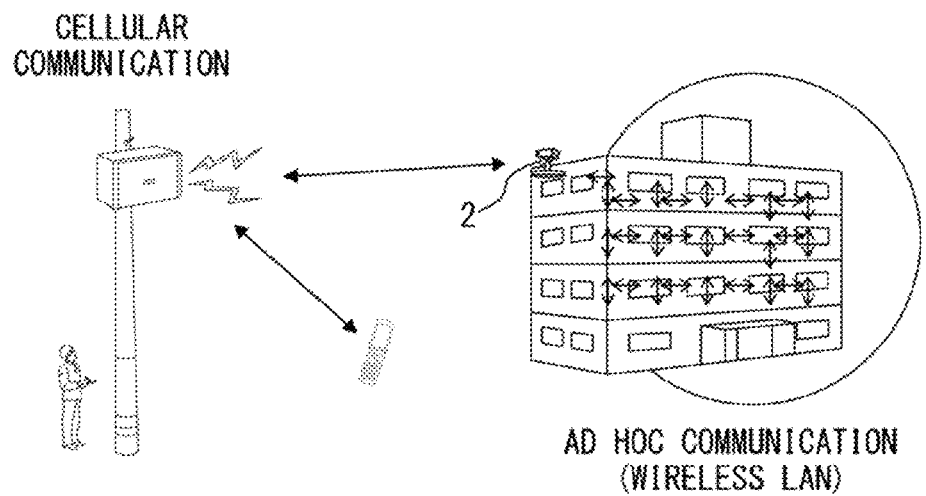
FIG. 1 illustrates an example of a case of relaying user data.
Figure 2:
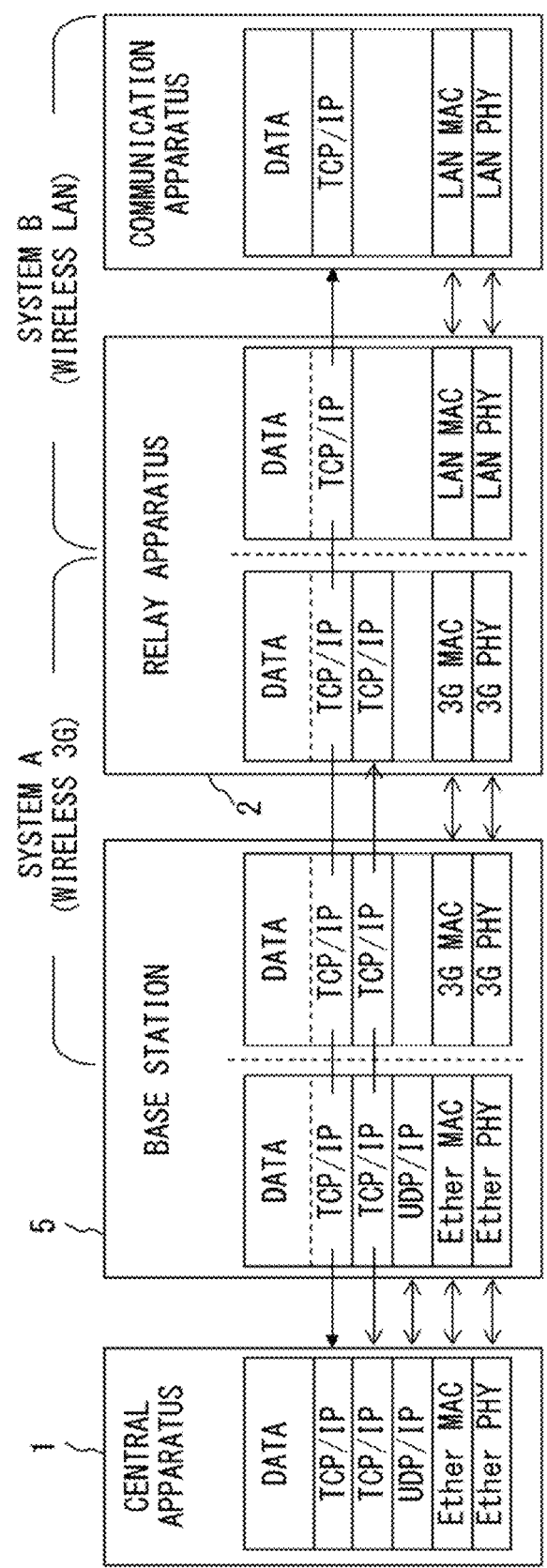
FIG. 2 is an explanatory view of an example of relaying user data.
Figure 3:
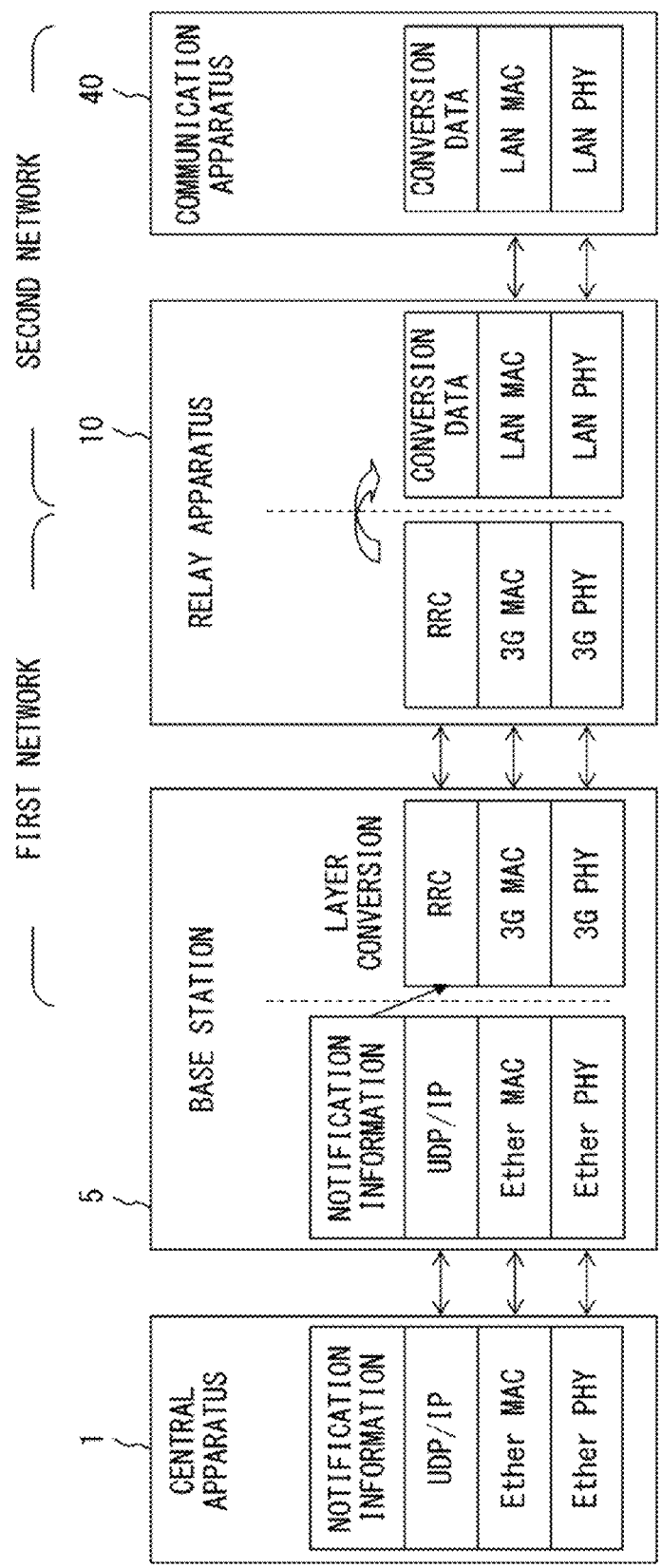
FIG. 3 is an explanatory view of an example of a method for relaying notification information transmitted via a control channel.

FIG. 3 is an explanatory view of an example of a method for relaying notification information transmitted via a control channel. In the following description, information that is broadcast to be notified to a communication apparatus belonging to one network and also used by a communication apparatus belonging to another network is sometimes referred to as "notification information". The notification information is, for example, emergency information such as an emergency earthquake alert that is broadcast from a base station to a cellular phone terminal positioned within a communication area of the base station. Assume that a relay apparatus 10 relays the notification information transmitted/received by a first network to a communication apparatus 40 belonging to a second network. Also assume that the first network and the second network respectively use different communication methods. The example of FIG. 3 assumes that a 3G wireless communication and a wireless LAN communication are respectively made in the first network and the second network.

A base station 5 receives the notification information from a central apparatus 1 via a wired network. The notification information is transmitted by using a layer equal to or higher than UDP (User Datagram Protocol)/IP. After converting the notification information into RRC (Radio Resource Control) data, the base station 5 transmits the data to a communication apparatus and a relay apparatus 10, which are positioned within a communication area, by using a control channel. Between the base station 5 and the relay apparatus 10, 3G MAC and 3G PHY are used in addition to RRC.

Upon receipt of a frame via the control channel, the relay apparatus 10 verifies whether or not the received frame includes notification information. Namely, the relay apparatus 10 extracts information also available to an apparatus other than the communication apparatus positioned in the communication area of the base station 5 within the information received via the control channel. The relay apparatus 10 generates conversion data to be notified to the communication apparatus 40 based on the extracted information. The relay apparatus 10 recognizes in advance a type of an application used by the communication apparatus 40 to notify a user of the notification information, and generates conversion data in a format that can be processed by an application running on the communication apparatus 40. In the following description, an application running on the communication apparatus 40 in order to notify a user of the notification information is sometimes referred to as a "notification application". The communication apparatus 40 notifies the user of the communication apparatus 40 by processing a frame received from the relay apparatus 10 with the notification application.

As described above, after converting the notification information included in control information received via the control channel within the first network into a format that can be processed by the communication apparatus 40, the relay apparatus 10 relays the notification information to the second network. Accordingly, notification information notified as control information in a certain network is also notified to a network using a communication system different from that of the certain network.

<Apparatus Configuration>

Also the following description assumes that a 3G wireless communication and a wireless LAN communication are respectively made in the first network and the second network. The following description also assumes that the notification information and the notification application are respectively emergency information and an application used to notify the emergency information.

Figure 4:
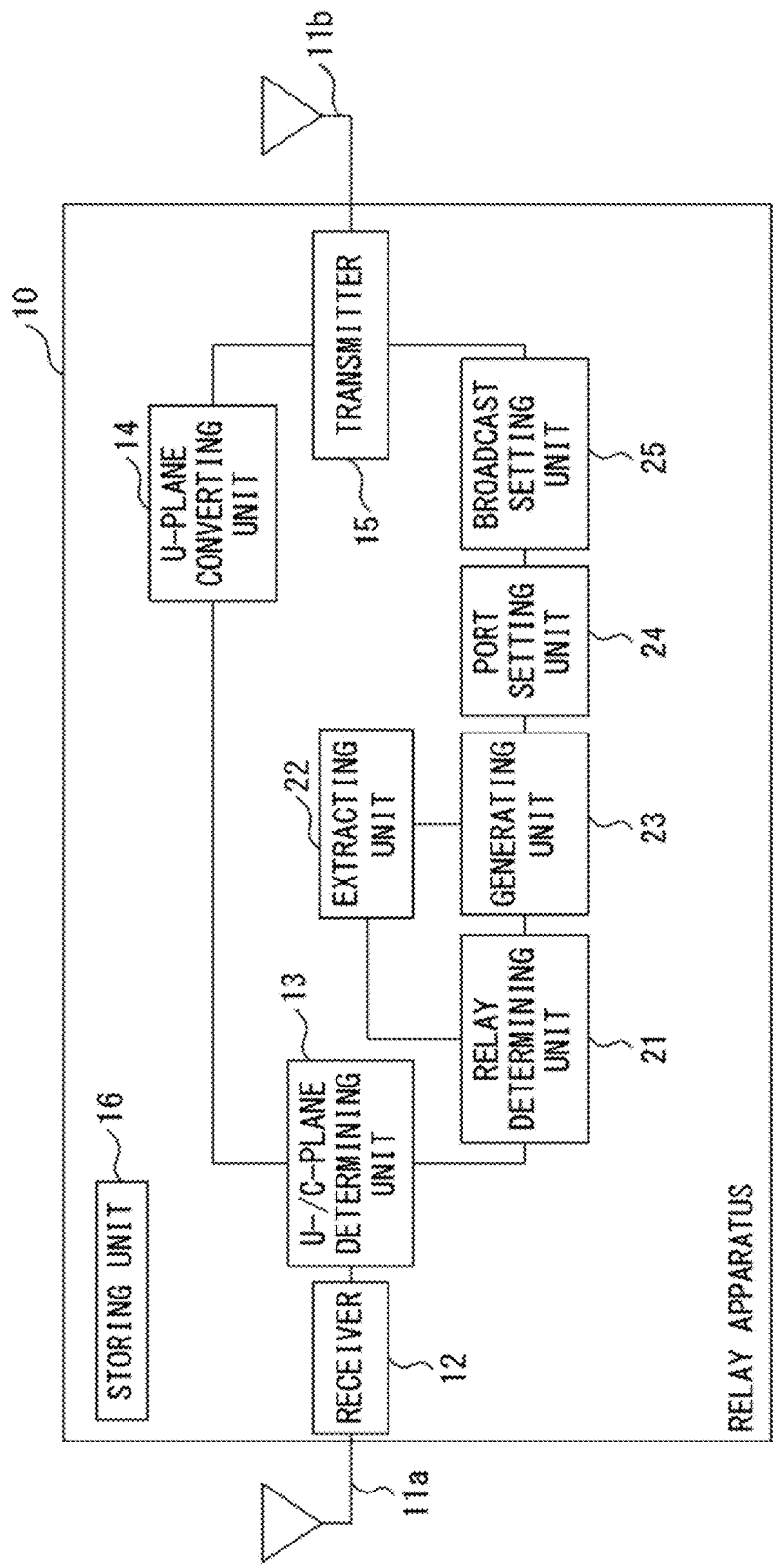
FIG. 4 illustrates an example of a configuration of a relay apparatus.

FIG. 4 illustrates an example of a configuration of the relay apparatus 10. The relay apparatus 10 includes a relay determining unit 21, an extracting unit 22, a generating unit 23, a port setting unit 24 and a broadcast setting unit 25. The relay apparatus 10 also includes antennas 11 (11a, 11b), a receiver 12, a U-/C-plane determining unit 13, a U-plane converting unit 14, a transmitter 15 and a storing unit 16. For ease of viewing FIG. 4, portions related to operations performed when a frame received from the first network is relayed to the second network are illustrated. For example, a receiving unit used when the relay apparatus 10 receives a frame from the second network side, a transmitting unit used when the relay apparatus 10 transmits a frame to the first network side, and other components within the relay apparatus 10 are not illustrated in FIG. 4.

The U-/C-plane determining unit 13 classifies frames received from the first network via the antenna 11a and the receiver 12 into a frame including user data and a frame for notifying control information. For example, the U-/C-plane determining unit 13 determines data received via the control channel as control information. The U-/C-plane determining unit 13 outputs the frame including user data to the U-plane converting unit 14, and outputs the frame for notifying control information to the relay determining unit 21.

The relay determining unit 21 verifies whether or not the frame input from the U-/C-plane determining unit 13 includes emergency information, and determines the frame including emergency information as a target to be relayed to the second network. The relay determining unit 21 outputs the frame including emergency information to the extracting unit 22. The extracting unit 22 extracts the emergency information included in the frame input from the relay determining unit 21. If the emergency information is partitioned into a plurality of frames, the extracting unit 22 regenerates the emergency information by executing a merging process after extracting individual pieces of the partitioned information. The extracting unit 22 outputs the obtained emergency information to the generating unit 23. Operations of the relay determining unit 21 and the extracting unit 22 will be described in detail later.

The generating unit 23 generates application layer information including the emergency information input from the extracting unit 22. Assume that the application layer information generated by the generating unit 23 has a format that can be processed by the communication apparatus 40 belonging to the second network. The generating unit 23 outputs the application layer information to the port setting unit 24.

Assume that the port setting unit 24 prestores a port number associated with a notification application used by the communication apparatus 40. The port setting unit 24 adds a transport layer header such as a UDP (User Datagram Protocol) header or the like to the application layer information generated by the generating unit 23 according to a communication method used between the communication apparatus 40 and the local relay apparatus 10. At this time, the port setting unit 24 sets a port number within the header to the port number associated with the notification application. The port setting unit 24 outputs, to the broadcast setting unit 25, a segment in which the port number is set. The broadcast setting unit 25 adds an IP header or a MAC header, in which an address is set to broadcast the input segment. Namely, the broadcast setting unit 25 sets a destination MAC address of the frame to FF:FF:FF:FF:FF:FF, and also sets a destination IP address to 255.255.255.255. The broadcast setting unit 25 outputs the frame after being set to the transmitter 15.

Upon receipt of the frame including user data from the U-/C-plane determining unit 13, the U-plane converting unit 14 converts the frame into a format that can be processed by the communication apparatus 40 belonging to the second network, and appropriately sets an address. The U-plane converting unit 14 outputs the frame after being processed to the transmitter 15. The transmitter 15 transmits the frame received from the broadcast setting unit 25 or the U-plane converting unit 14 to the second network via the antenna 11b. The storing unit 16 stores data used for processes executed by the relay apparatus 10. The storing unit 16 can store, for example, a port number set in a notification application, a recognition format in which the notification application recognizes data, and the like. The storing unit 16 can also store a disaster identification table and the like. The disaster identification table will be described later.

Figure 5:
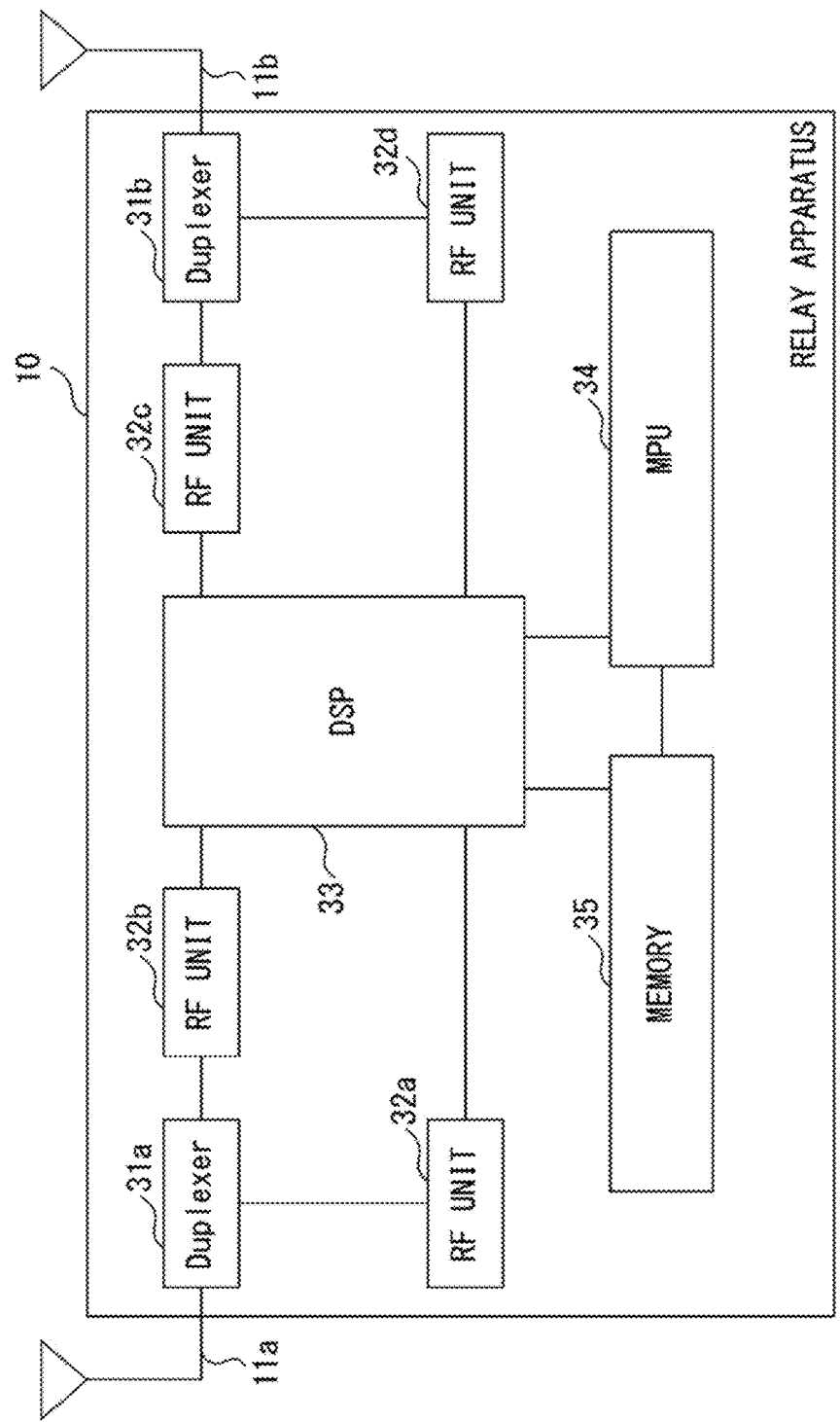
FIG. 5 illustrates an example of a hardware configuration of the relay apparatus.

FIG. 5 illustrates an example of a hardware configuration of the relay apparatus 10. The relay apparatus 10 includes antennas 11 (11a, 11b), duplexers 31 (31a, 31b), RF (Radio Frequency) units 32 (32a to 32d), a DSP (Digital Signal Processor) 33, an MPU (Micro Processing Unit) 34 and a memory 35. The duplexer 31a connects either of the RF unit 32a and the RF unit 32b to the antenna 11a. For example, if the RF unit 32a operates as the receiver 12, the duplexer 31a connects the RF unit 32a and the antenna 11a when the relay apparatus 10 receives a frame from the first network. In contrast, the duplexer 31a connects the RF unit 32b and the antenna 11a when the relay apparatus 10 transmits a frame to the first network. The duplexer 31b connects either of the RF unit 32c and the RF unit 32d to the antenna 11b. If the RF unit 32d operates as the transmitter 15, the duplexer 31b connects the RF unit 32d and the antenna 11b when the relay apparatus 10 transmits a frame to the second network. In contrast, the duplexer 31b connects the RF unit 32c and the antenna 11b when the relay apparatus 10 receives a frame from the second network.

The DSP 33 and the MPU 34 operate as the U-/C-plane determining unit 13, the U-plane converting unit 14, the relay determining unit 21, the extracting unit 22, the generating unit 23, the port setting unit 24 and the broadcast setting unit 25. The memory 35 operates as the storing unit 16. The memory 35 can appropriately store also a program running on the relay apparatus 10.

FIG. 6 illustrates an example of a configuration of the communication apparatus 40. The communication apparatus 40 includes an antenna 41, a network connecting unit 42 and a controlling unit 46. In the example of FIG. 6, the communication apparatus 40 includes the network connecting unit 42 and the controlling unit 46. However, the network connecting unit 42 may be implemented, for example, as a device attachable/detachable to/from the communication apparatus 40 without being included in the communication apparatus 40. The network connecting unit 42 and the controlling unit 46 may be implemented, for example, as a LAN card and a computer, respectively.

The network connecting unit 42 includes a receiver 43, a U-plane receiving unit 44, a transmitter 45 and a U-plane transmitting unit 47. For ease of viewing FIG. 6, part of the communication apparatus 40 is illustrated. FIG. 6 does not illustrate components such as a C-plane receiving unit for processing control information when the communication apparatus 40 receives a frame including control information from the relay apparatus 10 or the like. The controlling unit 46 includes a detecting unit 51, a storing unit 55 and an application processing unit 50. Moreover, if a plurality of applications run on the communication apparatus 40, the controlling unit 46 executes processes by using one application processing unit 50 for each of the applications. FIG. 6 illustrates the application processing unit 50 of a notification application. The application processing unit 50 of the notification application includes a deciding unit 52 and an outputting unit 53.

The receiver 43 receives a frame via the antenna 41. The U-plane receiving unit 44 outputs a frame that has been received via the receiver 43 and includes user data to the controlling unit 46 and the U-plane transmitting unit 47. When a frame including emergency information is input from the U-plane receiving unit 44, the U-plane transmitting unit 47 generates a broadcast frame for notifying other communication apparatuses belonging to the second network of the emergency information. Moreover, the communication apparatus 40 transmits a frame via the transmitter 45.

The detecting unit 51 detects the emergency information by verifying a port number included in the frame input from the U-plane receiving unit 44. Namely, when a frame is input, the detecting unit 51 verifies a port number of the UDP header, and determines that emergency information has been detected if the port number is a number associated with a notification application. Moreover, the detecting unit 51 outputs, to the deciding unit 52, user data included in the frame including the emergency information. Note that the detecting unit 51 outputs also user data included in a frame that does not include emergency information to an associated application according to a port number.

The deciding unit 52 analyzes the emergency information input from the detecting unit 51, and decides a method of an output process for making a user notice the emergency information. The outputting unit 53 executes the output process according to an instruction of the deciding unit 52. The outputting unit 53, for example, displays an output on a screen, outputs an alarm sound, or the like. The storing unit 55 stores, for example, the disaster identification table, an operation setting table, an Encode table and the like, and appropriately stores data used for the processes executed by the communication apparatus 40. The storing unit 55 also stores a recognition format in which a notification application recognizes data. The disaster identification table, the operation setting table and the encode table will be described later.

Figure 7:
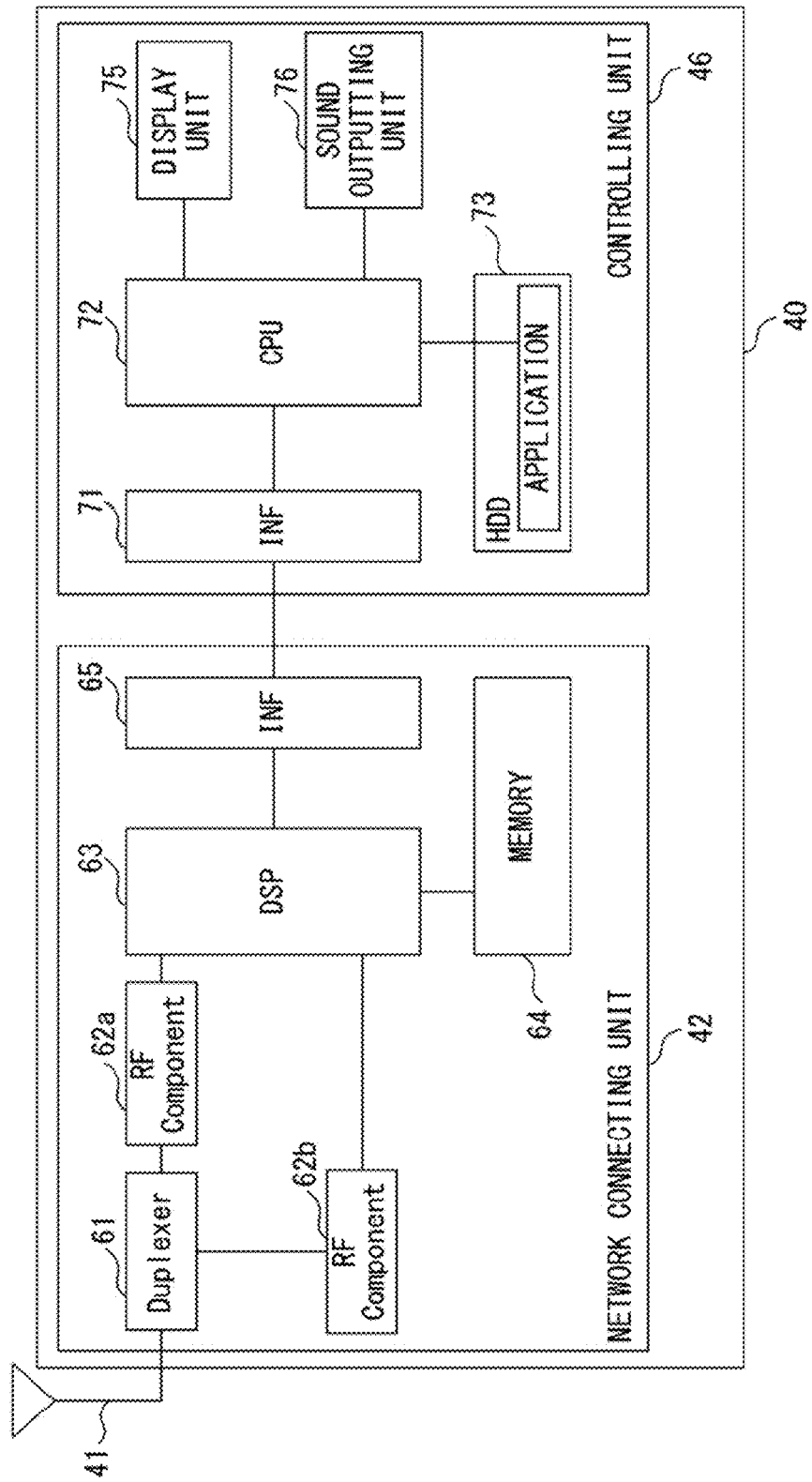
FIG. 7 illustrates an example of a hardware configuration of the communication apparatus.

FIG. 7 illustrates an example of a hardware configuration of the communication apparatus 40. The communication apparatus 40 includes a duplexer 61, RF units (62a, 62b), a DSP 63, a memory 64, interfaces (INFs) 65 and 71, a CPU (Central Processing Unit) 72, a hard disk 73, a display unit 75 and a sound outputting unit 76. The duplexer 61, the RF units 62, the DSP 63, the memory 64 and the interfaces (INFs) 65 operate as the network connecting unit 42. In the meantime, the controlling unit 46 includes an interface 71, a CPU 72, a hard disk 73, a display unit 75 and a sound outputting unit 76.

The RF unit 62b operates as the receiver 43, whereas the RF unit 62a operates as the transmitter 45. The duplexer 61 connects the RF unit 62b and the antenna 41 when the communication apparatus 40 receives a frame. In contrast, the duplexer 61 connects the RF unit 62a and the antenna 41 when a frame is transmitted from the relay apparatus 10. The DSP 63 operates as the U-plane receiving unit 44 and the U-plane transmitting unit 47.

The hard disk 73 stores a program of a notification application. The CPU 72 operates as the detecting unit 51, the deciding unit 52 and the outputting unit 53 by executing the program of the notification application. Also the display unit 73 and the sound outputting unit 76 operate as the outputting unit 53. The display unit 75 displays emergency information on a screen (not illustrated) according to an instruction of the deciding unit 52. The sound outputting unit 76 outputs an alarm sound for notifying reception of emergency information according to an instruction of the deciding unit 52. The hard disk 73 also operates as the storing unit 55.

First Embodiment

The first embodiment is described below by taking, as an example, a case where the second network is a wireless LAN ad hoc network. Here, assume that emergency information is notified with announcement information in the first network. Also assume that the announcement information is classified into a plurality of SIBs (System Information Blocks) and emergency information is notified with two blocks SIB 10 and SIB 11. The SIB 10 notifies an occurrence of a disaster and a type of the occurred disaster. The SIB 11 notifies information about the occurred disaster. For example, if the SIB 10 notifies an occurrence of an earthquake, the SIB 11 notifies an epicenter, a maximum intensity and the like of the occurred earthquake. The following description is merely one example of operations. The operations are sometimes modified depending on an implementation. For example, an order of procedures (4) and (5) are switched. Moreover, for example, if a load on the communication apparatus 40 is increased by displaying a text of emergency information on the screen, a procedure (16) is sometimes omitted.

(1) The base station 5 transmits a frame including announcement information to apparatuses positioned within a communication area of the local base station. In a relay apparatus 10 within the communication area of the base station 5, the receiver 12 receives the frame transmitted from the base station 5.

(2) The receiver 12 outputs the received announcement information to the U-/C-plane determining unit 13. The U-/C-plane determining unit 13 recognizes that the input frame is a C-plane frame, and outputs the frame to the relay determining unit 21.

(3) The relay determining unit 21 verifies the SIB 10 of the announcement information within the frame input from the U-/C-plane determining unit 13. As illustrated in FIG. 8, the SIB 10 includes information elements such as serialNumber, warningType, messageIdentifier and the like. The relay determining unit 21 decides whether or not to relay the frame to the second network by using a bit string of the warningType field.

FIG. 9 illustrates an example of a format of the warningType field. As illustrated in FIG. 9, the warningType field is a bit string of 2 bytes, and includes Warning Type Value, an alarm sound flag, a pop-up flag and padding. Warning Type Value is high-order 7 bits of the warningType field, and represents a type of a disaster notified with emergency information. The alarm sound flag and the pop-up flag are information for instructing a communication apparatus positioned within the communication area of the base station 5 of an operation performed when emergency information is received. Operation settings made by the alarm sound flag and the pop-up flag will be described later.

The relay determining unit 21 decides whether or not to relay the emergency information to the second network by searching the disaster identification table with the use of the bit string of Warning Type Value as a key. FIG. 10A illustrates an example of the disaster identification table. In the disaster identification table, a type of a disaster to be notified is recorded in association with Warning Type Value. In the example of FIG. 10A, if Warning Type Value is "0000000", "0000001" or "0000010", it indicates an occurrence of an earthquake, an occurrence of tsunami, or occurrences of an earthquake and tsunami. Moreover, emergency information where Warning Type Value is "0000100" notifies an occurrence of a disaster, such as a flood, a twister or the like, other than an earthquake and tsunami. Additionally, emergency information where Warning Type Value is "0000011" is a test transmission. Here, assume that the relay determining unit 21 decides to relay emergency information to the second network if the value of warningType ranges from "0000000" to "0000100".

The relay determining unit 21 associates a determination result with a value of serialNumber (see FIG. 8), and outputs the result to the extracting unit 22 and the generating unit 23. Here, serialNumber is a value for identifying an individual type of emergency information, and a different value is assigned to each type of emergency information. Accordingly, even if two types or more of emergency information are broadcast into the same region, the relay apparatus 10 can relay each of the types of emergency information.

(4) After deciding to relay the emergency information to the second network, the relay determining unit 21 obtains the values of the alarm sound flag and the pop-up flag, associates the obtained values with the value of serialNumber, and outputs the values to the generating unit 23. The alarm sound flag indicates whether or not to cause an apparatus that has received emergency information to output an alarm sound in order to allow a user to notice an occurrence of the emergency information. The pop-up flag indicates whether or not to cause an apparatus that has received emergency information to display the emergency information on a screen in order to allow a user to view the emergency information. The relay determining unit 21 outputs the values of the alarm sound flag and the pop-up flag to the generating unit 23, whereby the communication apparatus 40 that has received the emergency information can be instructed to perform an operation similar to that of a communication apparatus that has received the emergency information within the first network.

(5) The relay determining unit 21 outputs, to the extracting unit 22, the SIB 11 included in the announcement information input from the U-/C-plane determining unit 13. FIG. 11 illustrates an example of information elements included in the SIB 11. The SIB 11 includes information elements such as serialNumber, warningMessageSegment, dataCodingScheme and the like. Details of contents of the emergency information are included in the warningMessageSegment field. Accordingly, the extracting unit 22 extracts information recorded in the warningMessageSegment field, associates the extracted information with serialNumber, and outputs the information to the generating unit 23. Moreover, information stored in the warningMessageSegment field is a character string written in a language identified with the value of dataCodingScheme. Accordingly, the extracting unit 22 also extracts the value of dataCodingScheme, associates the extracted value with serialNumber, and outputs the value to the generating unit 23.

(6) The generating unit 23 generates application layer information to be transmitted to the communication apparatus 40 for the emergency information of serialNumber notified to be relayed from the relay determining unit 21 by using the information input from the extracting unit 22. If a plurality of types of emergency information are broadcast, the generating unit 23 generates one piece of application layer information by using data having the same value of serialNumber. Namely, the generating unit 23 generates user data including emergency information.

Figure 12A:
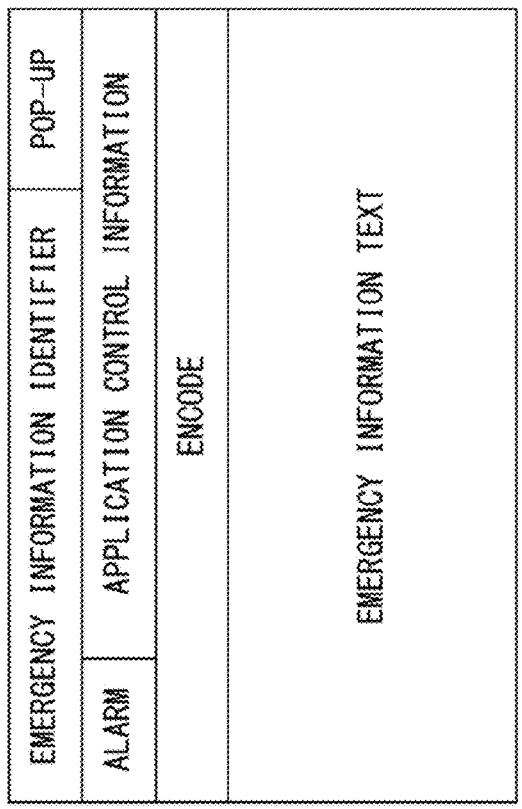
FIGS. 12A to 12C are explanatory views of an example of a frame generated by a relay apparatus.
Figure 12B:
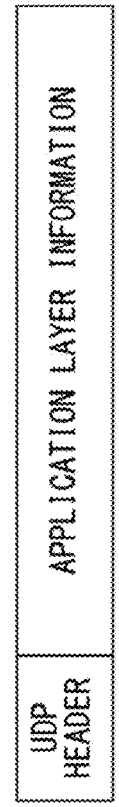
Figure 12C:
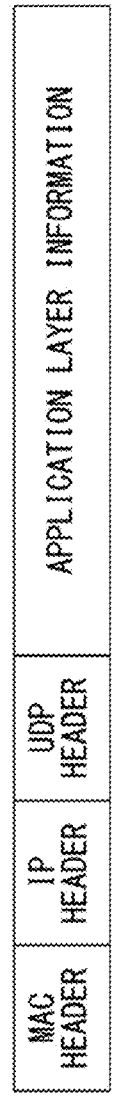

FIGS. 12A to 12C are explanatory views of an example of a frame generated by the relay apparatus 10. FIG. 12A illustrates an example of a format of the application layer information generated by the generating unit 23. The application layer information includes an emergency information identifier, a pop-up flag, an alarm flag, application control information, Encode and a text of emergency information. The generating unit 23 sets, as the emergency information identifier, a bit string of 7 bits recorded in the Warning Type Value field of the SIB 10. The pop-up flag is a value of the pop-up flag recorded in the SIB 10. The alarm flag is a value of the alarm sound flag recorded in the SIB 10. The application control information is information used to control an application running on the communication apparatus 40. The generating unit 23 generates the application control information according to an application running on the communication apparatus 40. The Encode is information for identifying a language in which the text of the emergency information is recorded. The generating unit 23 records the value of dataCodingScheme in the field of the Encode. Information recorded in the warningMessageSegment field is used as the text of the emergency information. The generating unit 23 outputs the generated application layer information to the port setting unit 24. Thereafter, a frame where a payload includes the application layer information is generated with procedures (7) and (8).

(7) The port setting unit 24 adds a transport layer header to the application layer information. If UDP is used as a protocol of the transport layer, the port setting unit 24 adds a UDP header to the application layer information as illustrated in FIG. 12B. The UDP header includes a destination port number. Therefore, the port setting unit 24 sets the port number associated with a notification application running on the communication apparatus 40 as a destination port number. The port setting unit 24 outputs the application layer information to which the transport header is added to the broadcast setting unit 25.

(8) The broadcast setting unit 25 generates a frame illustrated in FIG. 12C by adding an IP header and a MAC header to the data input from the port setting unit 24. The broadcast setting unit 25 sets a destination IP address to a broadcast address 255.255.255.255 when adding the IP header. Namely, the broadcast setting unit 25 sets an IP address to locally broadcast the frame to communication apparatuses 40 having the same sub network mask. Next, the broadcast setting unit 25 sets a destination address of the MAC header to FF:FF:FF:FF:FF:FF, so that the frame is broadcast.

(9) The broadcast setting unit 25 outputs, to the transmitter 15, the frame in which the addresses are set. At this time, the broadcast setting unit 25 notifies the transmitter 15 that the output frame is a frame including user data. The transmitter 15 transmits the frame including emergency information to the second network. Note that the transmitter 15 transmits the frame including the emergency information not via a control channel.

Figure 13:
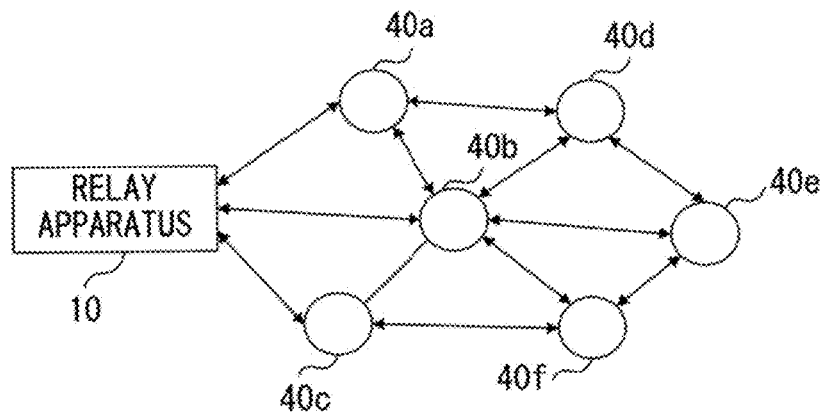
FIG. 13 illustrates an example of a relay apparatus and a second network.

(10) FIG. 13 illustrates an example of the relay apparatus 10 and the second network. In the example of FIG. 13, the second network is an ad hoc network including communication apparatuses 40a to 40f. The following description assumes that a notification application is activated in advance in all the communication apparatuses 40a to 40f, which are in a standby state.

When a frame is broadcast from the relay apparatus 10 in the procedure (9), all the communication apparatuses 40 positioned at the first hop from the relay apparatus 10 receive the frame including the emergency information from the relay apparatus 10. In the example of FIG. 13, the three communication apparatuses 40 (40a to 40c) receive the emergency information.

(11) In the following procedures, operations of the communication apparatus 40 that has received the frame including the emergency information are explained by taking, as an example, operations of the communication apparatus 40b. Also operations of the communication apparatuses 40a and 40c are similar to those of the communication apparatus 40b. The U-plane receiving unit 44 of the communication apparatus 40b receives the frame including the emergency information via the antenna 41 and the receiver 43. The U-plane receiving unit 44 outputs the frame including the emergency information to the detecting unit 51 and the U-plane transmitting unit 47.

(12) The U-plane transmitting unit 47 of the communication apparatus 40b changes information of the header in order to broadcast the frame input from the U-plane receiving unit 44 to the other communication apparatuses 40a, 40c to 40f within the second network. The U-plane transmitting unit 47 outputs the frame after being processed to the transmitter 45. The transmitter 45 broadcasts the frame input from the U-plane transmitting unit 47 via the antenna 41.

(13) The detecting unit 51 outputs the data to a corresponding application by verifying a destination port number set in the input frame. Here, the destination port number is set to a number associated with a notification application. The detecting unit 51 therefore determines that the emergency information has been detected. Accordingly, the detecting unit 51 outputs application layer information including the emergency information to the deciding unit 52.

(14) The deciding unit 52 verifies settings of an instructed operation by verifying the values of the pop-up flag and the alarm flag, which are included in the application layer information (FIG. 12A). At this time, the deciding unit 52 uses the operation setting table. FIG. 14 illustrates an example of the operation setting table. In the example of FIG. 14, the communication apparatus 40 that has received the emergency information outputs an alarm sound if the value of the alarm flag is "1". Alternatively, if the value of the alarm flag is "0", the communication apparatus 40 that has received the emergency information does not output an alarm sound. Moreover, if the value of the pop-up flag is "1", the communication apparatus 40 that has received the emergency information displays the emergency information on a screen. Alternatively, if the value of the pop-up flag is "0", the communication apparatus 40 does not display contents of the emergency information on the screen despite receiving the emergency information. The deciding unit 52 stores the operations instructed by the values of the pop-up flag and the alarm flag.

(15) When the emergency information is displayed on the screen, the deciding unit 52 searches the disaster identification table by using the emergency information identifier included in the application layer information (FIG. 12A) as a key. Here, assume that the communication apparatuses 40 (40a to 40f) hold the disaster identification table illustrated in FIG. 10B in the storing unit 55. The deciding unit 52 obtains a type of a disaster associated with the emergency information identifier, and outputs the type to the outputting unit 53 along with the information obtained with the procedure (14).

(16) The outputting unit 53 executes a process according to an instruction issued from the deciding unit 52. For example, if an alarm sound is instructed to be output, the outputting unit 53 outputs an alarm sound. Moreover, if it is instructed to be displayed on the screen, the outputting unit 53 displays the disaster type notified from the deciding unit 52 on the screen.

(17) If verifying that the instructed operation is settings for displaying the emergency information on the screen in the procedure (14), the deciding unit 52 further obtains the value of the Encode field and a text of the emergency information from the application layer information. Then, the deciding unit 52 searches the Encode table by using the value of the Encode field as a key. FIG. 15 illustrates an example of an Encode table. The deciding unit 52 transforms the text of the emergency information into a character string written in language that is obtained by the search using the value of the Encode field. The deciding unit 52 outputs the obtained character string to the outputting unit 53, and instructs the outputting unit 53 to display the character string on the screen. The outputting unit 53 displays the character string input from the deciding unit 52 on the screen.

Processes executed by the apparatuses in this embodiment are described next with reference to flowcharts. FIG. 16 is a flowchart for explaining an example of a method for determining whether or not received information is information to be relayed. FIG. 16 illustrates an example of operations of the relay apparatus 10 in the procedure (3). In the relay apparatus 10, upon receiving information from the first network (step S1), the U-/C-plane determining unit 13 initially determines whether or not the received information is U-plane information (step S2). If the received frame is a U-plane frame ("YES" in step S2), the U-/C-plane determining unit 13 outputs the frame to the U-plane converting unit 14, which processes the frame (step S3). Alternatively, if the received frame is not a U-plane frame ("NO" in step S2), the U-/C-plane determining unit 13 outputs the frame to the relay determining unit 21. The relay determining unit 21 verifies whether or not the received frame includes emergency information by verifying information included in the SIB 10 (step S4). If the received frame includes the emergency information ("YES" in step S4), the relay determining unit 21 sets the frame including the emergency information as a relay target (step S5). Alternatively, if the received frame does not include the emergency information ("NO" in step S4), the relay process is terminated (step S6).

FIG. 17 is a flowchart for explaining an example of operations of the relay apparatus 10 that has received information to be relayed. FIG. 17 illustrates an example of operations of the relay apparatus 10 in the procedures (4) to (9). Upon receipt of RRC information including emergency information, the relay determining unit 21 and the extracting unit 22 obtain the emergency information, and output the obtained information to the generating unit 23 (step S12). The generating unit 23 generates information (application layer information) processed with a notification application by using the data input from the relay determining unit 21 and the extracting unit 22 (step S13). Next, the port setting unit 24 adds a transport layer header including a port number corresponding to the notification application to the application layer information (step S14). Thereafter, the relay apparatus 10 broadcasts the frame including the application layer information to the second network.

FIG. 18 is a flowchart for explaining an example of operations of the communication apparatus 40 that has received emergency information. FIG. 18 illustrates an example of operations of the communication apparatus 40 in the procedures (11) to (16). FIG. 18 is merely one example of the operations of the communication apparatus 40. The operations are sometimes modified, for example, by executing steps S26 and S27 before steps S24 and 25. Alternatively, the operations are sometimes modified by executing the processes of steps S25 and S27 according to determination results after the determinations in steps S24 and S26 are made. Still alternatively, the process of step S28 may be executed at arbitrary timing according to an implementation after the determination in step S22 results in "YES".

Assume that the notification application is in a standby state as a resident service after the communication apparatus 40 is powered up (step S21). The detecting unit 51 verifies whether or not a frame where a port corresponding to a notification application is specified has been received (step S22). If the frame where the port corresponding to the notification application is specified has not been received yet ("NO" in step S22), the notification application continues to be in the standby state until receiving the frame where the port corresponding to the notification application is specified (step S21). Alternatively, if the frame where the port corresponding to the notification application is specified has been received ("YES" in step S22), the detecting unit 51 recognizes that information to be processed by the notification application has been received, and outputs the application layer information to the deciding unit 52 (step S23). The deciding unit 52 verifies the value of the pop-up flag included in the application layer information (step S24). If the value of the pop-up flag is "1", the deciding unit 52 obtains disaster information associated with an emergency information identifier by using the disaster identification table (FIG. 10B). Then, the deciding unit 52 outputs the obtained information to the outputting unit 53, and makes the outputting unit 53 display the disaster information (step S25). For example, if emergency information that notifies an occurrence of an earthquake is relayed, a character string "earthquake occurred" is displayed on the screen of the communication apparatus 40. Alternatively, if the value of the pop-up flag is "0" (step S24), no display is made on the screen. Next, the deciding unit 52 verifies the value of the alarm flag (step S26). If the value of the alarm flag is "1" ("YES" in step S26), the outputting unit 53 makes an alarm sound according to an instruction from the deciding unit 52 (step S27). Alternatively, if the value of the alarm flag is "0" ("NO" in step S26), no alarm sound is made. Thereafter, the communication apparatus 40 broadcasts the frame including the emergency information (step S28). The example of FIG. 18 refers, as an example, to the case where only the information of the emergency information identification is displayed on the screen. As described above, however, the operations of the communication apparatus 40 are sometimes modified so that both the information of the emergency information identifier and the text of the emergency information are displayed.

Figure 19:
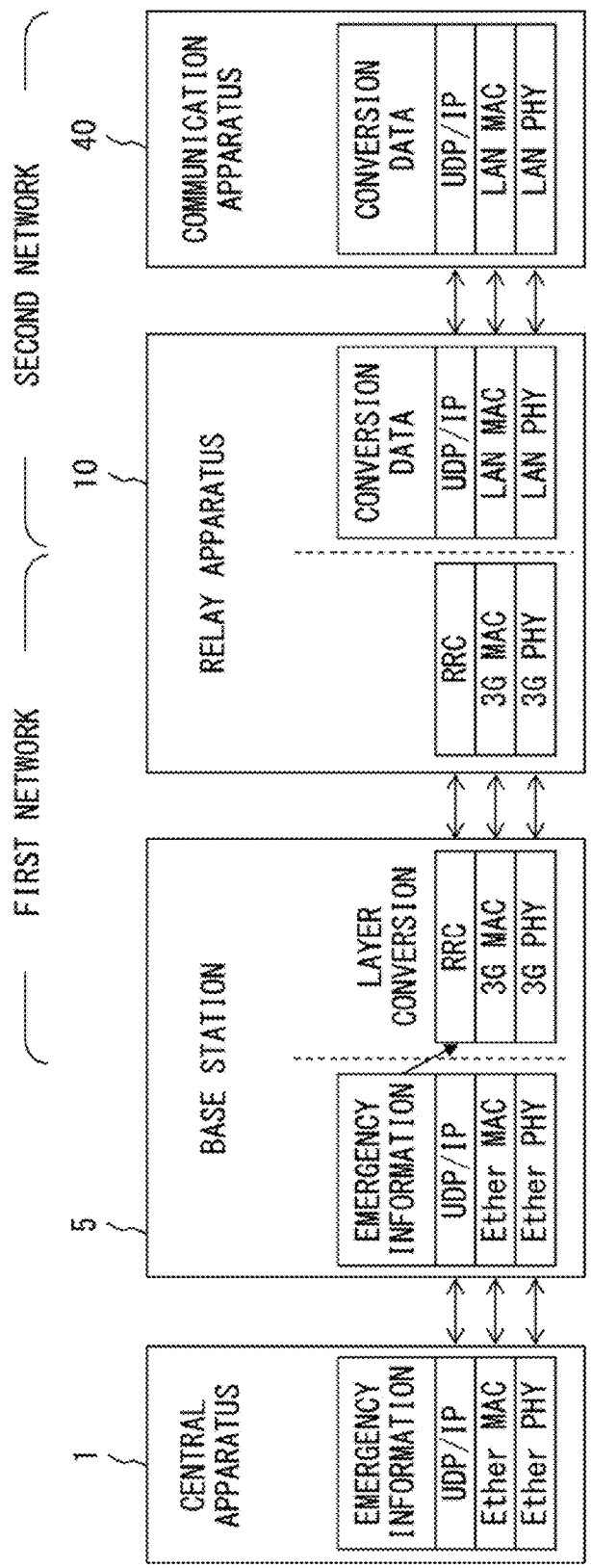
FIG. 19 illustrates an example of a method for relaying emergency information in a first embodiment.

As described above, the relay apparatus 10 relays the emergency information received as control information of the first network to the second network as user data in a format that can be processed by the communication apparatus 40. Accordingly, as illustrated in FIG. 19, notification information notified as control information of the first network is notified to the second network having a different communication system. FIG. 19 illustrates a state where emergency information is relayed according to the first embodiment. In FIG. 19, user data in the format that can be processed by the communication apparatus 40 is represented as "conversion data".

Emergency information notified as control information is notified across a plurality of networks using different communication systems, whereby the emergency information can be easily notified. Assume that a plurality of computers form an ad hoc network and also a relay apparatus 10 joins the ad hoc network. Also assume that the relay apparatus 10 is positioned within the communication area of the base station 5. When the base station 5 notifies emergency information to communication apparatuses and the relay apparatus 10, which are positioned within the communication area, in this state, the relay apparatus 10 relays the emergency information as user data after converting the emergency information into a format that can be processed by a computer A belonging to the ad hoc network. Assume that the emergency information is notified to the computer A and, for example, displayed on a screen of the computer A as a result. Thereafter, the computer A broadcasts the frame including the emergency information also to the other computers belonging to the ad hoc network. In this way, the emergency information is notified to all the computers that belong to the ad hoc network, and the information is, for example, displayed on the screen of the computers as instructed by the emergency information. Moreover, in this embodiment, a text of emergency information is displayed after a type of a disaster is displayed, whereby an occurrence of the disaster can be quickly notified to a user.

Second Embodiment

The second embodiment refers to a method by which the relay apparatus 10 relays emergency information after merging information of texts when the emergency information is notified with a plurality of frames. For example, if a text of emergency information is long, there is a possibility that the emergency information cannot be notified with one frame. Therefore, in the second embodiment, the extracting unit 22 verifies whether or not emergency information is notified with one frame. Moreover, if the emergency information is notified with a plurality of frames, the extracting unit 22 generates application layer information by merging information included in the individual frames. In the following description, a text of emergency information included in one frame is sometimes referred to as an "information segment" when a text of the emergency information is notified with a plurality of frames.

Operations of the extracting unit 22 are described below with reference to FIG. 11. As described above in the first embodiment, a text of emergency information is notified by the warningMessageSegment field of the SIB 11. If notified data cannot be accommodated in the warningMessageSegment field of one frame, the emergency information is partitioned into a plurality of information segments, and notified with a plurality of frames. Each of the frames notifies each of the information segments.

The extracting unit 22 verifies whether or not the emergency information is partitioned into a plurality of information segments by using the value of warningMessageSegmentNumber and the warningMessageSegmentType field. The warningMessageSegmentType indicates whether or not an information segment included in a frame is the last information segment of the emergency information. In a frame that does not include the last information segment of the emergency information, the value of the warningMessageSegmentType field is set to notLastSegment. In contrast, in a frame including the last information segment of the emergency information, the value of the warningMessageSegmentType field is set to lastSegment. Accordingly, if receiving the SIB 11 where the value of the warningMessageSegmentType field is notLastSegment, the extracting unit 22 determines that the emergency information is partitioned into a plurality of information segments. The extracting unit 22 holds a text recorded in the warningMessageSegment field in association with the value of warningMessageSegmentNumber.

Here, a larger value of warningMessageSegmentNumber is assigned to an information segment closer to the beginning of emergency information, and the value ranges from integers 0 to 63. Namely, the value of warningMessageSegmentNumber represents an order of information segments. Assume that the value of warningMessageSegmentNumber of an information segment included in a frame A is "0" and the value of warningMessageSegmentNumber of an information segment included in a frame B is "1". In this case, the extracting unit 22 can recognize that data in the information segment included in the frame B succeeds data in the information segment included in the frame A.

The extracting unit 22 repeats the process for obtaining a text recorded in the warningMessageSegment field in association with the value of warningMessageSegmentNumber until receiving the SIB 11 where the value of the warningMessageSegmentType field is LastSegment. Thereafter, upon receiving the SIB 11 where the value of the warningMessageSegmentType field is LastSegment, the extracting unit 22 merges obtained contents of the warningMessageSegment field in an ascending order of the value of warningMessageSegmentNumber.

FIG. 20 is a flowchart for explaining the operations of the extracting unit 22 in the second embodiment. Upon receipt of the SIB 11 including the same value of serialNumber as that of serialNumber notified to be relayed from the relay determining unit 21, the extracting unit 22 extracts a text of emergency information (information segment) (step S31). Assume that the extracting unit 22 stores a value of warningMessageSegmentNumber in association with each information segment. Next, the extracting unit 22 verifies whether or not the value of the warningMessageSegmentType field of the frame to be processed is LastSegment (step S32). If the value of the warningMessageSegmentType field is not set to LastSegment ("NO" in step S32), the extracting unit 22 continues the reception process (step S33) by repeating the processes in steps S31 to S33. Alternatively, if the value of the warningMessageSegmentType field is set to LastSegment ("YES" in step S32), the extracting unit 22 merges information segments extracted so far (step S34). When the information segments are merged, this process is executed so that a smaller value of the warningMessageSegmentType field gets closer to the beginning of the emergency information. Upon termination of the process for merging the information segments, the generating unit 23, the port setting unit 24 and the broadcast setting unit 25 generate a broadcast frame by using the merged information. The generated frame is transmitted by the transmitter 15 (step S35).

Also in the second embodiment, processes of the relay determining unit 21, the generating unit 23, the port setting unit 24, the broadcast setting unit 25, the antennas 11, the receiver 12, the U-/C-plane determining unit 13, the U-plane converting unit 14 and the transmitter 15 are similar to those in the first embodiment. Also operations of the communication apparatus 40 are similar to those in the first embodiment.

As described above, the communication apparatus 40 does not need to organize a reception order if the relay apparatus 10 relays emergency information after merging texts of the emergency information into one frame when the emergency information is relayed from the first network to the second network. This lightens a process load imposed on the communication apparatus 40.

Third Embodiment

The third embodiment refers to a case where emergency information is conveyed by a MAC header (Media Access Control header) and a MAC message (Media Access Control message). The third embodiment assumes that the second network is a wireless LAN network and a communication apparatus belonging to the second network operates in an infrastructure mode.

Figure 21:
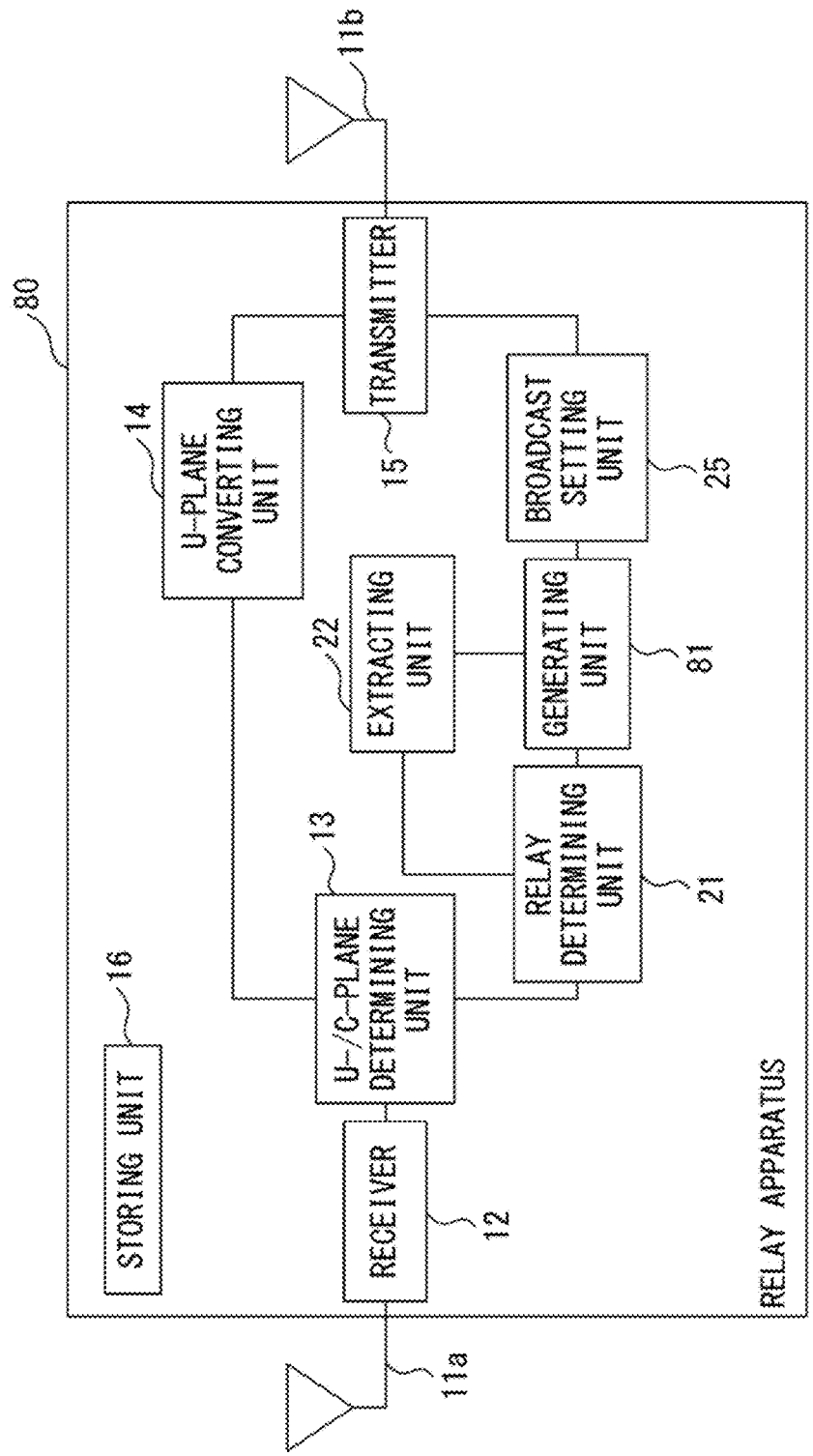
FIG. 21 illustrates an example of a configuration of a relay apparatus.

FIG. 21 illustrates an example of a configuration of a relay apparatus 80. The relay apparatus 80 includes a generating unit 81, antennas 11 (11a, 11b), a receiver 12, a U-/C-plane determining unit 13, a U-plane converting unit 14, a transmitter 15, a storing unit 16, a relay determining unit 21, an extracting unit 22 and a broadcast setting unit 25. The generating unit 81 converts emergency information extracted by the extracting unit 22 into MAC layer information. Moreover, the generating unit 81 generates a frame for notifying control information. Operations of the generating unit 81 will be described in detail later. Operations of the antennas 11, the receiver 12, the U-/C-plane determining unit 13, the U-plane converting unit 14, the transmitter 15, the relay determining unit 21, the extracting unit 22 and the broadcast setting unit 25 are similar to those in the first or the second embodiment. Assume that the storing unit 16 stores settings of the MAC header for a frame for notifying emergency information, a format of the MAC message, a disaster identification table and the like.

FIG. 22 illustrates an example of a configuration of a communication apparatus 90. The communication apparatus 90 includes a U-/C-plane determining unit 92, a LAN MAC receiving unit 93, a controlling unit 94, an application processing unit 95, an antenna 41, a receiver 43 and a U-plane receiving unit 44. The application processing unit 95 includes a storing unit 96, a deciding unit 97 and an outputting unit 90. For ease of viewing FIG. 22, portions related to operations according to the third embodiment within the communication apparatus 90 are illustrated. Also assume that the communication apparatus 90 includes a transmitter 45 and the like, and can transmit data.

The U-/C-plane determining unit 92 classifies frames received via the antenna 41 and the receiver 43 into a frame including user data and a frame for notifying control information. The U-/C-plane determining unit 92 outputs data received via the control channel to the LAN MAC receiving unit 93 as control information. In the meantime, the U-/C-plane determining unit 92 outputs the frame including the user data to the U-plane converting unit 14.

The LAN MAC receiving unit 93 verifies whether or not the frame for notifying the control information is a frame for notifying emergency information by referencing the MAC header. The LAN MAC receiving unit 93 outputs the frame including the emergency information to the controlling unit 94. In contrast, a frame that does not include emergency information is used to process the control information. The controlling unit 94 outputs the frame to the application processing unit 95 after adding an API (Application Program Interface) of the notification application to the MAC message of the frame input from the LAN MAC receiving unit 93.

The deciding unit 97 processes the MAC message input from the controlling unit 94, and decides a method of an output process for making a user notice the emergency information. Here, assume that the deciding unit 97 recognizes the format of the MAC message and processes information within the MAC message. The outputting unit 98 executes a process such as a display on a screen, an alarm sound output and the like according to an instruction of the deciding unit 97. The storing unit 96 stores a disaster identification table, an operation setting table, an Encode table and the like, and appropriately stores data used for processes executed by the application processing unit 95. The disaster identification table, the operation setting table and the Encode table are similar to those in the first embodiment. Moreover, operations of the U-plane receiving unit 44 and the like are similar to those in the first embodiment.

Figure 23:
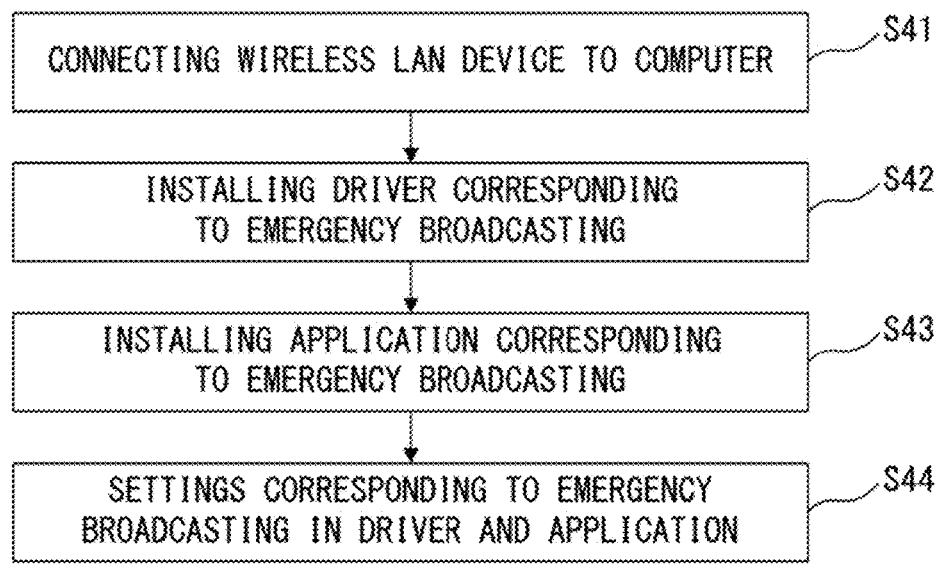
FIG. 23 illustrates an example of procedures for setting a communication apparatus.

Incidentally, emergency information is received as MAC layer information in the third embodiment. Therefore, the notification application starts to run at timing when the network connecting unit 91 has detected a frame including emergency information. Namely, the network connecting unit 91 converts the emergency information within the MAC frame into a format that can be processed by the application processing unit 95. Accordingly, the network connecting unit 91 can be caused, for example, to load in advance a driver or the like corresponding to a process of emergency information. Assuming that the network connecting unit 91 is a wireless LAN device such as a LAN card or the like and the application processing unit 95 is a computer, a user can implement the communication apparatus 90 with procedures illustrated in FIG. 23. Initially, the user connects the wireless LAN device to the computer (step S41). Next, the user installs the driver corresponding to broadcasting of emergency information in the wireless LAN device (step S42). Then, the user installs an application (notification application) corresponding to the broadcasting of emergency information in the computer (step S43). When the driver and application, which have been installed in steps S42 and S43, are set for the broadcasting of emergency information, the wireless LAN device and the computer can operate as the communication apparatus 90.

Processes executed in the third embodiment are described below with reference to the drawings.

(21) A method by which the relay apparatus 80 verifies whether or not a frame including emergency information has been received from the base station 5 is similar to that implemented with the procedures (1) to (3) described in the first embodiment.

(22) Upon deciding to relay emergency information to the second network, the relay determining unit 21 obtains values of the alarm sound flag and the pop-up flag, associates the values of the flags with the value of serialNumber, and outputs the values to the generating unit 81.

(23) The relay determining unit 21 outputs, to the extracting unit 22, the SIB 11 included in announcement information input from the U-/C-plane determining unit 13. The extracting unit 22 extracts information recorded in the warningMessageSegment field, associates the extracted information with serialNumber, and outputs the information to the generating unit 81. To identify a language in which the information stored in the warningMessageSegment field is recorded, the extracting unit 22 also extracts the value of dataCodingScheme, associates the value with serialNumber, and outputs the value to the generating unit 81.

(24) The generating unit 81 generates a frame for notifying emergency information. At this time, the generating unit 81 can appropriately read a format from the storing unit 16. FIG. 24A illustrates an example of the format of the frame for notifying emergency information. The frame for notifying emergency information includes a MAC header, a MAC message and FCS (Frame Check Sequence). The MAC header includes a frame control field, a duration/ID field, a destination address, a source address, BSSID (Basic Service Set IDentifier) and a sequence control field. For the frame for notifying emergency information, the generating unit 81 records information indicating that emergency information is included in the frame control field.

FIG. 24B illustrates an example of a format of the frame control field of the frame for notifying emergency information. The frame control field includes protocol version information, a type, a sub-type, ToDS, FromDS, More Flag (More Flagment), Retry, power management, MoreData, WEP (Wired Equivalent Privacy) and Order. Assume that the generating unit 81 sets 2 bits that indicate protocol version information to "11" as illustrated in FIG. 24B. Also assume that a value of the protocol version information is set to "00" in a frame that does not notify emergency information. FIGS. 24C and 24D illustrate the format of the frame that does not notify emergency information. FIG. 24D enlarges and illustrates the frame control field of the frame illustrated in FIG. 24C.

FIG. 25 illustrates an example of a format of the MAC message generated by the generating unit 81. The MAC message includes an emergency information identifier, a pop-up flag, an alarm flag, Reserve (reserved area), Encode and a text of emergency information. The generating unit 81 sets, as the emergency information identifier, the value of the Warning Type Value field within the SIB 10. Moreover, the generating unit 81 sets, as the pop-up flag, the value of the pop-up flag within the SIB 10, and also sets, as the alarm flag, the value of the alarm sound flag within the SIB 10. The reserved area is used, for example, to set an option. The generating unit 81 records the value of dataCodignScheme in the Encode field. Moreover, the generating unit 81 sets, as the text of emergency information, information recorded in the warningMessageSegment field.

(25) The generating unit 81 outputs the generated frame to the broadcast setting unit 25. The broadcast setting unit 25 sets a destination address of the frame input from the generating unit 81 to a broadcast address. Namely, the broadcast setting unit 25 sets the value of the destination address field of the MAC header to FF:FF:FF:FF:FF:FF.

(26) The broadcast setting unit 25 outputs, to the transmitter 15, the frame in which the address is set. At this time, the broadcast setting unit 25 notifies the transmitter 15 that the output frame is a frame including control information. The transmitter 15 transmits the frame including emergency information to the second network via a control channel.

(27) When the frame is broadcast from the relay apparatus 80 with the procedure (26), the communication apparatus 90 within the second network receives the frame including emergency information.

(28) A receiver 43 included in the communication apparatus 90 outputs the received frame to the U-/C-plane determining unit 92. The U-/C-plane determining unit 92 recognizes that the input frame is a C-plane frame, and outputs the frame to the LAN MAC receiving unit 93.

(29) The LAN MAC receiving unit 93 obtains high-order 2 bits of the frame control field by referencing the MAC header of the received frame. If the obtained bit string is "11", the LAN MAC receiving unit 93 determines that the received frame includes emergency information, and outputs the frame to the controlling unit 94. Alternatively, if the value of the obtained bit string is not "11", the LAN MAC receiving unit 93 outputs the frame to a C-plane receiving unit (not illustrated), which is caused to use the frame as control information.

Figure 26:
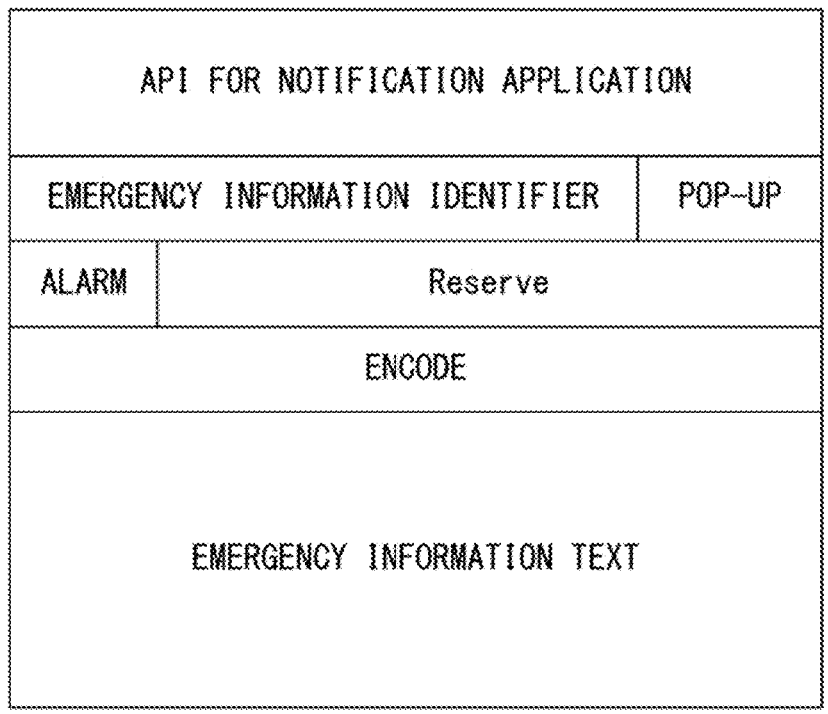
FIG. 26 illustrates an example of a MAC message to which an API is added.

(30) The controlling unit 94 adds an API of a notification application to the MAC message of the frame input from the LAN MAC receiving unit 93. FIG. 26 illustrates an example of the MAC message to which the API is added by the controlling unit 94.

(31) The controlling unit 94 inputs, to the deciding unit 97, the MAC message to which the API is added. The deciding unit 97 verifies whether or not the MAC message includes the API associated with the notification application. If the MAC message does not include the API associated with the notification application, the deciding unit 97 discards the MAC message without executing the process for the MAC message. Alternatively, if the MAC message includes the API associated with the notification application, the deciding unit 97 verifies the values of the pop-up flag and the alarm flag within the MAC message, and recognizes operations instructed by the emergency information. At this time, the deciding unit 97 uses the operation setting table (FIG. 14).

(32) If the emergency information is displayed on the screen, the deciding unit 97 searches the disaster identification table (FIG. 10B) by using the emergency information identifier within the MAC message as a key. The deciding unit 97 obtains a type of a disaster associated with the emergency information identifier, and outputs the type to the outputting unit 98 along with the information obtained with the procedure (31). Moreover, the deciding unit 97 recognizes a language in which the emergency information is recorded based on the value of the Encode field and the Encode table. Additionally, the deciding unit 97 converts a text of the emergency information within the MAC message into a character string written in the recognized language. The deciding unit 97 also outputs, to the outputting unit 98, the character string obtained by being converted.

(33) The outputting unit 98 executes a process such as a display on a screen, an alarm sound output or the like according to an instruction from the deciding unit 97.

Figure 27:
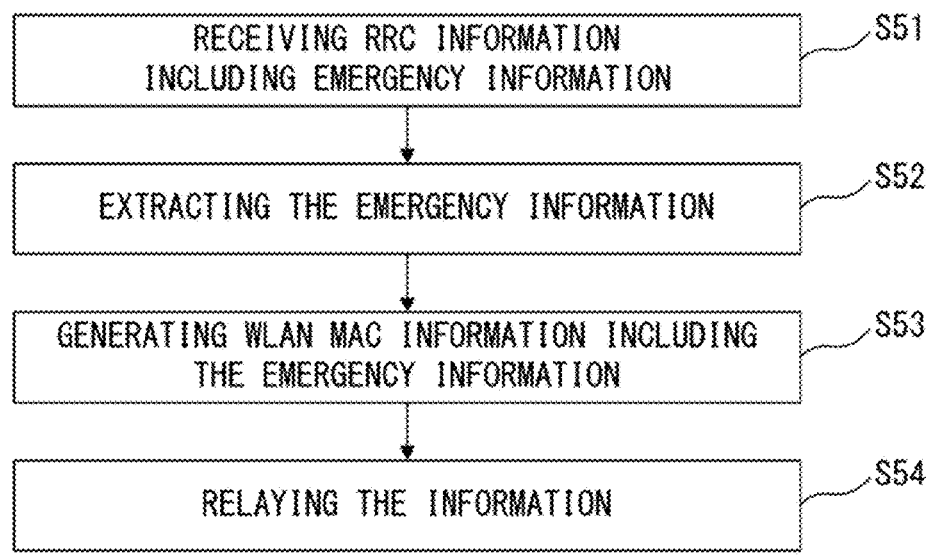
FIG. 27 is a flowchart for explaining an example of operations of a relay apparatus that has received information to be relayed.

FIG. 27 is a flowchart for explaining an example of operations of the relay apparatus 80 that has received information to be relayed. FIG. 27 illustrates the example of operations of the relay apparatus 80 in the procedures (21) to (26). Upon receipt of RRC information including emergency information (step S51), the relay determining unit 21 and the extracting unit 22 obtain the emergency information, and output the obtained information to the generating unit 80 (step S52). The generating unit 81 generates a MAC message including the data input from the relay determining unit 21 and the extracting unit 22, and adds a MAC header indicating that the emergency information is included (step S53). Next, the broadcast setting unit 25 makes settings so that the frame generated by the generating unit 81 is broadcast. Thereafter, the relay apparatus 80 broadcasts the frame including the emergency information to the second network via a control channel (step S54).

Figure 28:
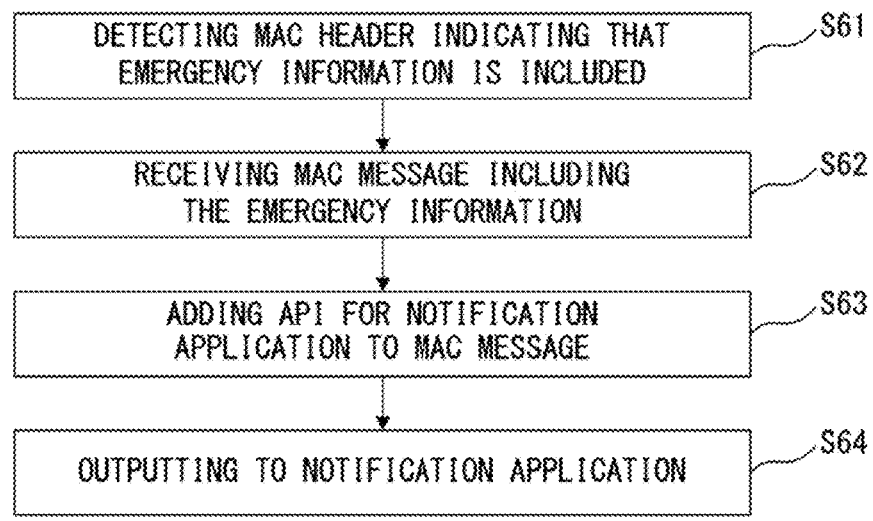
FIG. 28 is a flowchart for explaining an example of operations of a network connecting unit.

FIG. 28 is a flowchart for explaining an example of operations of the network connecting unit 91. The LAN MAC receiving unit 93 receives a C-plane frame from the U-/C-plane determining unit 92. The LAN MAC receiving unit 93 verifies whether or not the MAC header of the received frame includes information indicating that emergency information is included. If detecting the MAC header indicating that emergency information is included within the frame (step S61), the LAN MAC receiving unit 93 outputs, to the controlling unit 94, the MAC message including the emergency information (step S62). The controlling unit 94 adds an API corresponding to a notification application to the MAC message input from the LAN MAC receiving unit 93 (step S63). The controlling unit 94 outputs the MAC message, to which the API is added, to the application processing unit 95 of the notification application (step S64).

Figure 29:
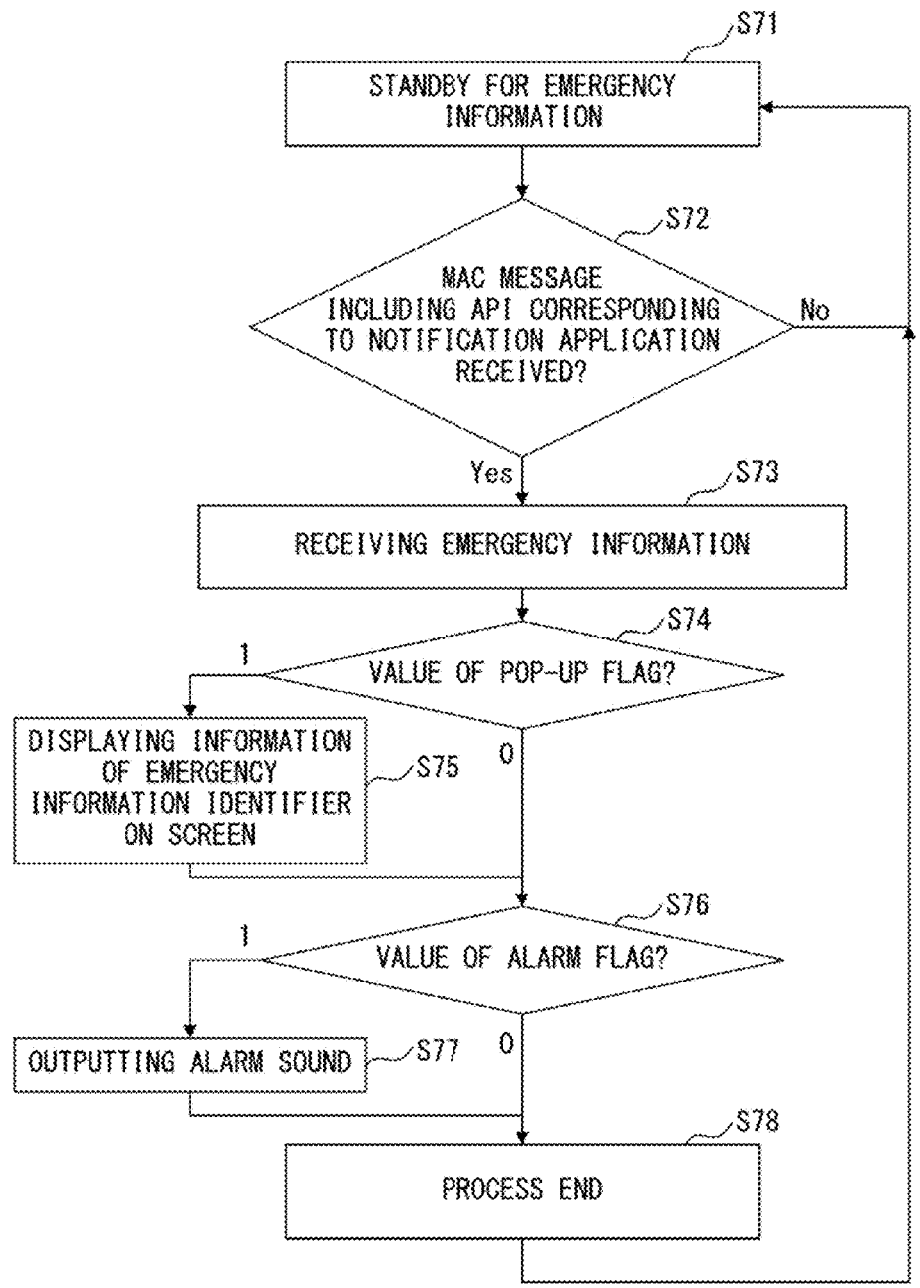
FIG. 29 is a flowchart for explaining an example of operations of an application processing unit.

FIG. 29 is a flowchart for explaining an example of operations of the application processing unit 95. FIG. 29 is merely one example of the operations of the communication apparatus 90. The operations are sometimes modified, for example, by executing steps S76 and S77 before steps S74 and S75.

Assume that the notification application is in a standby state as a resident service after the communication apparatus 90 is powered up (step S71). The deciding unit 97 verifies whether or not a MAC message including an API corresponding to a notification application has been received (step S72). If the MAC message including the API corresponding to the notification application has not been received yet ("NO" in step S72), the notification application continues to be in the standby state until receiving the MAC message including the API corresponding to the notification application (step S71). Alternatively, if the MAC message including the API corresponding to the notification application has been received ("YES" in step S72), the deciding unit 97 recognizes that the MAC message including the emergency information has been obtained (step S73). In steps S74 to S77, processes similar to those of steps S24 to S27 described with reference to FIG. 18 are executed by the application processing unit 95. When the process by the outputting unit 98 has been executed according to an instruction from the deciding unit 97 (step S78), the communication apparatus 90 recognizes that the process for the frame including the emergency information has been executed, and reenters the standby state (step S71).

Figure 30A:
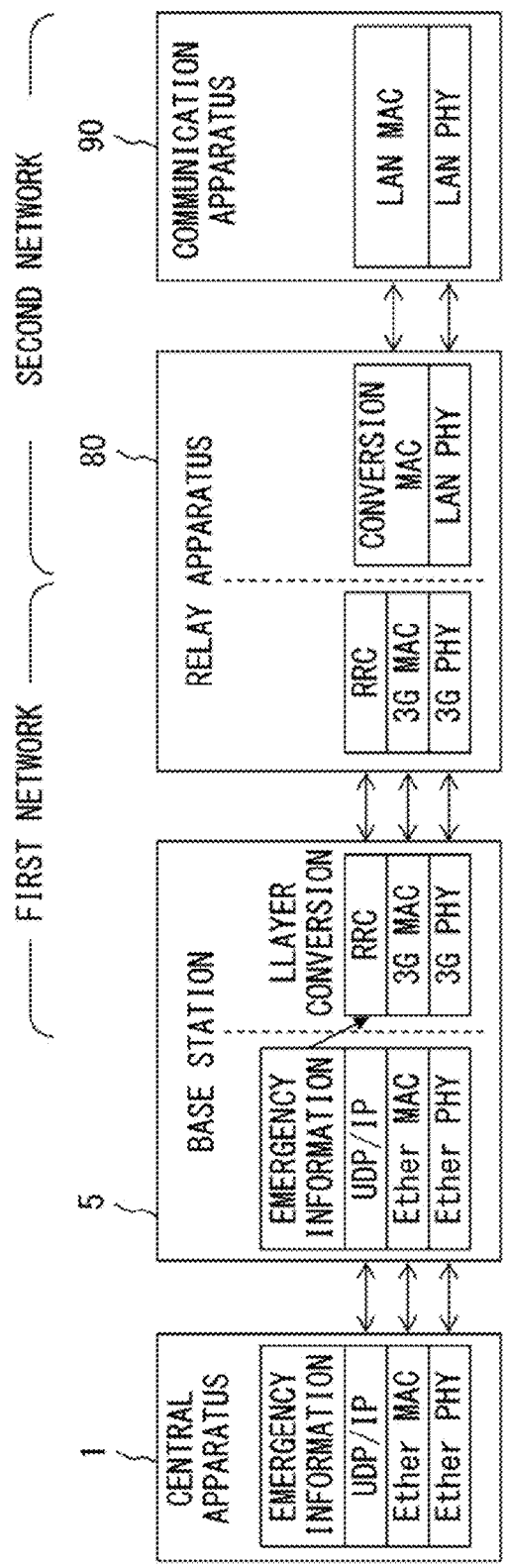
FIGS. 30A to 30B illustrate an example of a method for relaying emergency information in a third embodiment.

As described above, the relay apparatus 80 relays emergency information received from the base station 5 as control information of the first network to the second network by using information of the MAC layer. Moreover, the emergency information is broadcast as control information in a format that can be processed by the communication apparatus 90. Accordingly, as illustrated in FIG. 30A, notification information notified as the control information of the first network is notified to the second network using a different communication system. Note that the MAC layer information in the format that can be processed by the communication apparatus 90 is represented as "conversion MAC" in FIG. 30A.

In the third embodiment, emergency information is notified by using information of the MAC layer. Therefore, emergency information is notified with a layer lower than that in the first embodiment. For this reason, the length of time needed from reception of a frame including emergency information until recognition of the emergency information by the communication apparatus 90 is expected to be shorter than that of the communication apparatus 40. This leads to a possibility that emergency information is notified to a user or other communication apparatuses 90 faster than in the first embodiment.

Figure 30B:
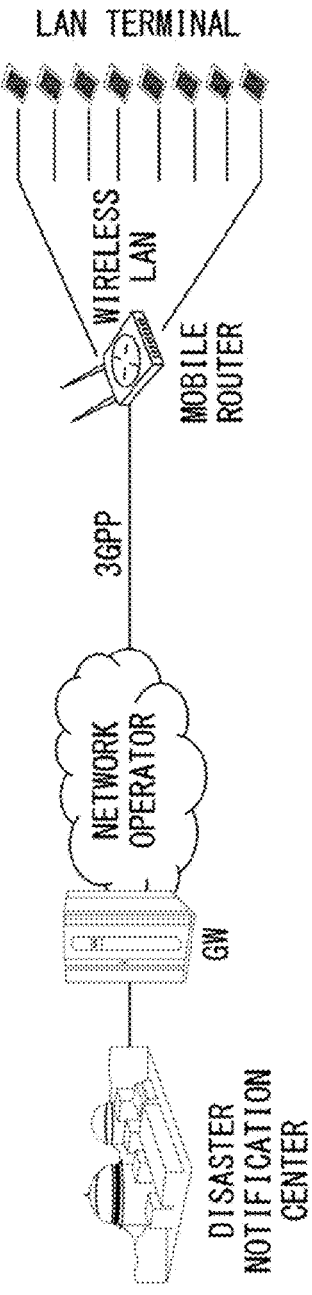

FIG. 30B illustrates an example of a system according to the third embodiment. In FIG. 30B, the second network is a wireless LAN network, while the first network is a network where a communication conforming to the 3GPP (3rd Generation Partnership Project) standard is made. Emergency information is notified from a disaster notification center to a communication apparatus within an operator network via GW (Gate Way). Then, a base station within the operator network notifies communication apparatuses within a communication area of the base station of the emergency information. Assume that also a mobile router receives a frame including the emergency information from the base station at this time. Also assume that the mobile router makes a wireless LAN communication with LAN terminals positioned within a communication area of the local mobile router although it operates as a 3GPP terminal for an apparatus conforming to the 3GPP. In this case, the mobile router generates, according to the third embodiment, a frame including notification information received from the base station, and broadcasts the generated frame to the wireless LAN terminals. As a result, the LAN terminal can receive the emergency information with the frame relayed by the mobile router.

<Others>

The present invention is not limited to the above described embodiments, and can be modified in a variety of ways. Several examples of modifications are described below.

A selection of emergency information to be relayed is sometimes modified according to an implementation. For example, the relay determining unit 21 can also determine not to relay emergency information transmitted as a test. Moreover, even if Warning Type Value is specified in the reserved area (Warning Type Value ranges from 0000101 to 1111111), the operations are sometimes modified to make the relay determining unit 21 select emergency information as a relay target when Warning Type Value is assigned to a particular disaster or the like.

Additionally, the relay determining unit 21 can also verify the value of serialNumber included in the SIB 11, and the SIB 11 for notifying contents of emergency information to be relayed to the second network can be output to the extracting unit 22.

If a plurality of types of emergency information are broadcast, the individual types of emergency information are identified according to the value of serialNumber. The generating unit 23 or the generating unit 81 generates a frame by verifying whether or not all the pop-up flag, the alarm sound flag, the warningMessageSegment field, dataCodingScheme and Warning Type Value are associated with the same value of serialNumber.

Note that the relay apparatus 10 can relay emergency information to a network where the communication apparatus 40 operates in an infrastructure mode also in the first and the second embodiments. Moreover, the transport layer protocol used in the first and the second embodiments is not limited to UDP, and sometimes modified to an arbitrary protocol including a port number of an application.

Note that a notification application is sometimes modified to collaborate with an application, such as electronic mail software or the like, frequently used by a user. In this case, the relay apparatus 10 or 80 generates a notification frame in accordance with a format of electronic mail. For example, disaster information indicated by an emergency information identifier is set as a subject of electronic mail. The relay apparatus 10 or 80 sets the subject of electronic mail by appropriately using the disaster identification table. Upon recognizing that mail including emergency information has been received, a notification application running on the communication apparatus 40 or 90 that has received a notification frame displays the emergency information included in the received frame by using electronic mail software. Moreover, the notification application makes a new mail notification function of the electronic mail software display the emergency information on a screen. In this case, the electronic mail software for which predetermined settings are made displays the emergency information in a format similar to that of an arrival of new mail according to a request from the notification application. Moreover, the notification application can also output an alarm sound with the electronic mail software.

With the above described method, emergency information broadcast in one system is relayed to another system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a receiver configured to receive a signal via a control plane of a first network which uses a first protocol, the control plane being used for broadcasting control information;
a processor that
classifies frames received from the first network into frames including user data and frames for reporting control information, wherein data received via the control plane is determined as control information,
determines a frame including notification information from the frames for reporting control information, wherein the notification information has been broadcast to a communication apparatus belonging to the first network and is to be used by a communication apparatus belonging to a second network which uses a second protocol different from the first protocol,
extracts the notification information from the frame which is determined as a frame including the notification information, and
generates a notification frame to be used to notify the communication apparatus belonging to the second network of the extracted notification information according to a frame format of a user plane which is used for communicating the user data of the communication apparatus belonging to the second network,
determines a second frame including the user data and outputting the second frame to a converting unit for converting to a format that can be processed by the communication apparatus belonging to the second network; and
a transmitter configured to transmit the generated notification frame or converted second frame to the communication apparatus belonging to the second network via the user plane of the second network.

2. The communication apparatus according to claim 1, further comprising
a memory which stores a recognition format, in which a notification application running on the communication apparatus belonging to the second network recognizes data, in order to notify a user of the notification information, wherein
the processor includes the notification information in the notification frame as data corresponding to the recognition format.

3. The communication apparatus according to claim 1, further comprising
a memory which stores a notification setting that is a setting of a media access control header used to detect the notification information by the notification application running on the communication apparatus belonging to the second network in order to notify a user of the notification information, wherein
the processor sets the media access control header of the notification frame as the notification setting, and records the notification information in a media access control message of the notification frame.

4. The communication apparatus according to claim 1, wherein
when the notification information is partitioned into a first segment and a second segment, the first segment is broadcast by first announcement information, and the second segment is broadcast by second announcement information, the extracting unit extracts the first segment form the first announcement information, also extracts the second segment from the second announcement information, and obtains the notification information by merging the first segment and the second segment.

5. The communication apparatus according to claim 1, further comprising:
a disaster identification table in which a disaster identifier for identifying a disaster notified from a base station belonging to the first network is recorded, wherein
the processor
determines a target frame which includes a disaster identifier recorded in the disaster identification table as a frame to be relayed from the first network to the second network, and
extracts the notification information from the target frame.

6. A communication method for causing a relay apparatus, which relays data between a first network and a second network, to execute a process, the process comprising:
receiving a signal via a control plane of the first network which uses a first protocol, the control plane being used for broadcasting control information;

classifying frames received from the first network into frames including user data and frames for reporting control information, wherein data received via the control plane is determined as control information;

determining a frame including notification information from the frames for reporting control information, wherein the notification information has been broadcast to a communication apparatus belonging to the first network and is to be used by a communication apparatus belonging to a second network which uses a second protocol different from the first protocol;

extracting the notification information from the frame which is determined as a frame including the notification information;

generating a notification frame to be used to notify the communication apparatus belonging to the second network of the extracted notification information according to a frame format of a user plane which is used for communicating the user data of the communication apparatus belonging to the second network;

determining a second frame including the user data and outputting the second frame to a converting unit for converting to a format that can be processed by the communication apparatus belonging to the second network; and transmitting the generated notification frame or the converted second frame to the communication apparatus belonging to the second network via the user plane of the second network.

7. A non-transitory storage medium on which is recorded a program for causing a relay apparatus, which relays data between a first network and a second network, to execute a process, the process comprising:

receiving a signal via a control plane of the first network which uses a first protocol, the control plane being used for broadcasting control information;

classifying frames received from the first network into frames including user data and frames for reporting control information, wherein data received via the control plane is determined as control information;

determining a frame including notification information from the frames for reporting control information, wherein the notification information has been broadcast to a communication apparatus belonging to the first network and is to be used by a communication apparatus belonging to a second network which uses a second protocol different from the first protocol;

extracting the notification information from the frame which is determined as a frame including the notification information;

generating a notification frame to be used to notify the communication apparatus belonging to the second network of the extracted notification information according to a frame format of a user plane which is used for communicating the user data of the communication apparatus belonging to the second network;

determining a second frame including the user data and outputting the second frame to a converting unit for converting to a format that can be processed by a communication apparatus belonging to the second network; and transmitting the generated notification frame or the converted second frame to the communication apparatus belonging to the second network via the user plane of the second network.

\* \* \* \* \*